US012355880B2

(12) United States Patent
Cheng

(10) Patent No.: US 12,355,880 B2
(45) Date of Patent: Jul. 8, 2025

(54) CONSENSUS METHOD USED FOR MINER NODE IN BLOCKCHAIN SYSTEM AND BLOCKCHAIN SYSTEM

(71) Applicant: SHENZHEN RED BRICK TECHNOLOGY CO., LTD., Shenzhen (CN)

(72) Inventor: Qiang Cheng, Guangdong (CN)

(73) Assignee: SHENZHEN RED BRICK TECHNOLOGY CO., LTD., Shenzhen (CN)

( * ) Notice: Subject to any disclaimer, the term of this patent is extended or adjusted under 35 U.S.C. 154(b) by 470 days.

(21) Appl. No.: 17/144,353

(22) Filed: Jan. 8, 2021

(65) Prior Publication Data
US 2021/0176058 A1 Jun. 10, 2021

Related U.S. Application Data

(63) Continuation-in-part of application No. PCT/CN2019/090356, filed on Jun. 6, 2019.

(30) Foreign Application Priority Data

Jul. 10, 2018 (CN) .......................... 201810751530.8

(51) Int. Cl.
H04L 29/06 (2006.01)
G06F 16/27 (2019.01)
(Continued)

(52) U.S. Cl.
CPC ................ *H04L 9/30* (2013.01); *G06F 16/27* (2019.01); *G06Q 20/065* (2013.01);
(Continued)

(58) Field of Classification Search
CPC ....... H04L 9/30; H04L 9/0894; H04L 9/3236; H04L 9/3247; H04L 9/50; H04L 9/3297;
(Continued)

(56) References Cited

U.S. PATENT DOCUMENTS

2014/0310243 A1* 10/2014 McGee ................... G06F 16/27
707/639
2015/0363481 A1* 12/2015 Haynes .................. G06Q 10/10
707/748

(Continued)

FOREIGN PATENT DOCUMENTS

CN 106296191 A 1/2017
CN 107172135 A 9/2017
(Continued)

OTHER PUBLICATIONS

International Search Report and Written Opinion dated Sep. 2, 2019 in the PCT Application No. PCT/CN2019/090356.
(Continued)

*Primary Examiner* — Joseph P Hirl
*Assistant Examiner* — Leynna Truvan

(57) ABSTRACT

Disclosed are a blockchain system and a consensus method for use in a miner node in a blockchain system. A specific embodiment of the method includes: acquiring a lower-limit accumulative unused duration; executing, in a trusted execution environment associated with the miner node, a bookkeeping right determination operation including: determining a current accumulative unused duration for the miner node; determining whether the current accumulative unused duration is more than the lower-limit accumulative unused duration; and, in response to the determination that the current accumulative unused duration is more than the lower-limit accumulative unused duration, determining that the miner node has won a bookkeeping right, and updating the current accumulative unused duration with a difference between the current accumulative unused duration and the lower-limit accumulative unused duration. This embodiment allows for reduced electric power consumption in a blockchain system.

17 Claims, 8 Drawing Sheets

(51) Int. Cl.
- *G06Q 20/06* (2012.01)
- *G06Q 20/36* (2012.01)
- *H04L 9/08* (2006.01)
- *H04L 9/30* (2006.01)
- *H04L 9/32* (2006.01)
- *H04L 9/00* (2022.01)

(52) U.S. Cl.
CPC ....... *G06Q 20/3678* (2013.01); *H04L 9/0894* (2013.01); *H04L 9/3236* (2013.01); *H04L 9/3247* (2013.01); *H04L 9/50* (2022.05)

(58) Field of Classification Search
CPC ..... H04L 9/3239; H04L 9/321; H04L 9/0637; H04L 2025/03605; H04L 67/1074; G06F 16/27; G06F 16/9024; G06F 12/06; G06Q 20/065; G06Q 20/3678; G06Q 20/3823; G06Q 20/3825; G06Q 20/3827; G06Q 20/3829; G06Q 40/04; Y02D 10/00; G05B 2219/35428; G05B 2219/35567; G05B 2219/36074; G05B 19/0415; G05B 2219/15126; H03K 5/04; H04N 2201/3215

See application file for complete search history.

(56) References Cited

U.S. PATENT DOCUMENTS

| | | | |
|---|---|---|---|
| 2018/0109541 A1* | 4/2018 | Gleichauf | H04W 8/24 |
| 2018/0294967 A1* | 10/2018 | Roberts | H04L 9/3255 |
| 2020/0272618 A1* | 8/2020 | Hughes | H04L 9/3236 |

FOREIGN PATENT DOCUMENTS

| | | |
|---|---|---|
| CN | 107231351 A | 10/2017 |
| CN | 107317730 A | 11/2017 |
| CN | 107733651 A | 2/2018 |
| CN | 107832139 A | 3/2018 |
| CN | 108009811 A | 5/2018 |
| CN | 108182581 A | 6/2018 |
| CN | 108182636 A | 6/2018 |
| IN | 106452884 A | 2/2017 |

OTHER PUBLICATIONS

English Translation of the International Search Report and Written Opinion dated Sep. 2, 2019 in the PCT Application No. PCT/CN2019/090356.

Chinese Search Report for CN 201807515308, pp. 1-2 (Translation).

* cited by examiner

CONSENSUS METHOD USED FOR MINER NODE IN BLOCKCHAIN SYSTEM AND BLOCKCHAIN SYSTEM

CROSS-REFERENCE TO RELATED APPLICATIONS

The present disclosure is a continuation-in-part (CIP) application of PCT International Application No. PCT/CN2019/090356, filed with the Chinese Patent Office on Jun. 6, 2019, entitled "Consensus Method for Use in Miner Node in Blockchain System and Blockchain System", which claims priority to Chinese Patent Application No. 2018107515308, filed with the Chinese Patent Office on Jul. 10, 2018, entitled "Consensus Method for Use in Miner Node in Blockchain System and Blockchain System", which is incorporated herein by reference in its entirety.

TECHNICAL FIELD

The present disclosure relates to the field of computer technologies, and in particular to a consensus method for use in a miner node in a blockchain system and to a blockchain system.

BACKGROUND ART

In a current public blockchain of blockchain, PoW (Proof of Work) is mainly used as a consensus algorithm to determine which miner node gains a bookkeeping right. As a consensus algorithm, PoW has the advantages of wide adaptability and high security but has the biggest disadvantage of waste of a lot of electric power caused by meaningless hash collision calculations (commonly known as mining).

In a consortium blockchain of blockchain, PoET (Proof of Elapsed Time) is used as a consensus algorithm, but the current PoET consensus algorithm relies on a particular model of CPU. The consortium blockchain is a blockchain system created among particular organizations, thus it is acceptable to specify the uniform use of a particular model of CPU in the consortium blockchain. However, a public blockchain system is not adapted to the use of a limited particular model of CPU. Therefore, the current PoET is not suitable for use in public blockchain.

SUMMARY

The present disclosure proposes a blockchain system and a consensus method for use in a miner node in a blockchain system.

In a first aspect, the present disclosure provides a consensus method for use in a miner node in a blockchain system. The method includes: acquiring a lower-limit accumulative unused duration; and executing, in a trusted execution environment associated with the miner node, a bookkeeping right determination operation including: determining a current accumulative unused duration for the miner node; determining whether the current accumulative unused duration is more than the lower-limit accumulative unused duration; and, in response to the determination that the current accumulative unused duration is more than the lower-limit accumulative unused duration, determining that the miner node has won a bookkeeping right, and updating the current accumulative unused duration with a difference between the current accumulative unused duration and the lower-limit accumulative unused duration.

In a second aspect, the present disclosure provides a blockchain system. The blockchain system includes at least one parallel chain. The parallel chain includes routing nodes and at least one miner node, wherein the routing nodes of the at least one parallel chain are connected over a network. An account address is bound to the miner node. The routing node is configured to: synchronize a blockchain of a miner node in the same chain as the routing node to a local blockchain in real time. The miner node is configured to compete for the bookkeeping right for an intrachain transaction request in a parallel chain, where the miner node is located, by a method including: acquiring a lower-limit accumulative unused duration; and executing, in a trusted execution environment associated with the miner node, a bookkeeping right determination operation including: determining a current accumulative unused duration for the miner node; determining whether the current accumulative unused duration is more than the lower-limit accumulative unused duration; and, in response to the determination that the current accumulative unused duration is more than the lower-limit accumulative unused duration, determining that the miner node has won the bookkeeping right, and updating the current accumulative unused duration with a difference between the current accumulative unused duration and the lower-limit accumulative unused duration.

BRIEF DESCRIPTION OF THE DRAWINGS

Other feature, objects, and advantages of the present disclosure will become more apparent by reading the detailed description of non-limiting embodiments with reference to the following drawings.

DETAILED DESCRIPTION OF THE EMBODIMENTS

Figure 1:
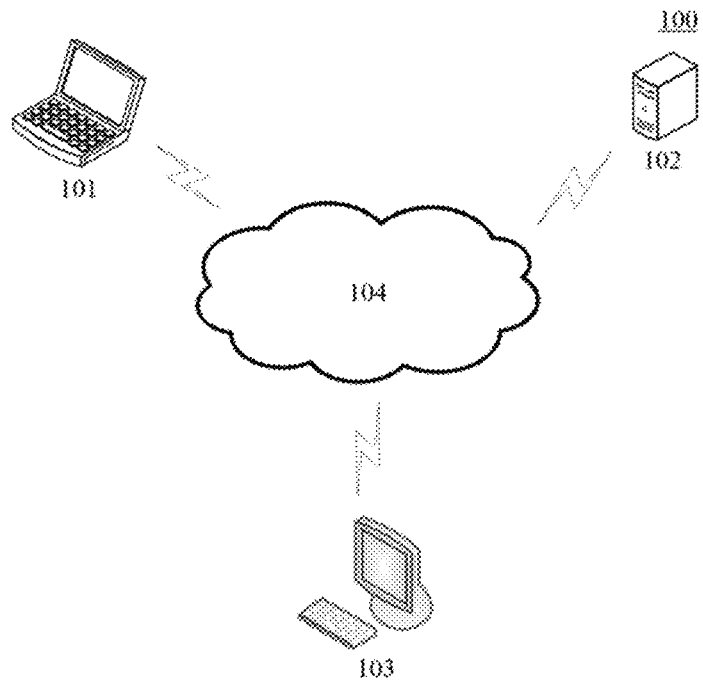
FIG. 1 is a diagram of an exemplary system architecture to which an embodiment of the present disclosure is applicable.

The present disclosure will be described in further detail below with reference to the accompanying drawings and embodiments. It will be understood that the specific embodiments described here are only intended to explain a relevant invention, but not intended to limit the invention. In addition, it should be noted that only the parts related to the relevant invention are shown in the drawings for ease of description.

It should be noted that the embodiments in the present disclosure and the features in the embodiments may be combined with each other without conflict. The present disclosure will be described below in detail with reference to the accompanying drawings and in connection with embodiments.

FIG. 1 shows an exemplary system architecture 100 to which an embodiment of a consensus method for use in a miner node in a blockchain system or a consensus apparatus for use in a miner node in a blockchain system of the present disclosure is applicable.

As shown in FIG. 1, the system architecture 100 may include miner nodes 101, 102, and 103, and a network 104. The network 104 acts as a medium for providing communication links among the terminal devices (miner nodes) 101, 102, and 103. The network 104 may include various connection types, for example, wired and wireless communication links, or optic cables, or the like.

Users may use the miner nodes 101, 102, and 103 to interact with other miner nodes through the network 104 to receive or send messages or the like. Various communication client applications, such as blockchain bookkeeping applications, digital currency wallet applications, web browser applications, shopping applications, search applications, instant messaging tools, email clients, social platform software, and so on, may be installed on the miner nodes 101, 102, and 103.

The miner nodes 101, 102, and 103 may be hardware or software. When the terminal devices (miner nodes) 101, 102, and 103 are hardware, they may be various electronic devices associated with trusted execution environments (TEE), including, but not limited to, smart phones, tablet computers, laptop computers, desktop computers, and so on. When the miner nodes 101, 102, and 103 are software, they may be installed in the electronic devices listed above. Each of them may be implemented as multiple software or software modules (for providing blockchain bookkeeping services or providing digital currency wallet services, for example), or as a single software or software module. They are not specifically limited here.

Here, the TEE is an operating environment that coexists with Rich OS (usually Android or the like) on a device and provides security services for the Rich OS. The TEE has its own execution space. Hardware and software resources that are accessible by the TEE are separated from those of the Rich OS. The TEE provides an environment for secure execution of trusted applications (TA) and also protects the confidentiality, integrity, and access right of resources and data of the trusted applications. The TEE should be verified and isolated from the Rich OS while being securely booted, in order to ensure the root of trust for the TEE itself. In the TEE, individual trusted applications are independent of one another and are not accessible to one another without authorization.

As an example, a TEE associated with a miner node may be implemented in the following two manners.

(1) A trusted execution environment is constructed by means of security protection capabilities provided by a particular CPU chip, such as Intel SGX, ARM Trust Zone, or the like.

In order to guarantee the strength of security, trusted supporting hardware may be added to the underlayer of the trusted execution environment, for example, by using a security chip conforming to the Trusted Platform Module (TPM) Standard, or using a security chip conforming to the Trusted Cryptography Module (TCM) Standard.

(2) A trusted execution environment is implemented by using an encryption lock (commonly known as a dongle).

A common dongle is often packaged as a compact USB (Universal Serial Bus) device. The dongle not only provides a file storage, but also provides support for running customized programs. The device requirements for a miner node are reduced by using a dongle, because it is unnecessary to limit the device type of the miner node, as long as the miner node has a USB interface.

The individual miner nodes in the system architecture 100 constitute a blockchain system, and the individual miner nodes in the system architecture 100 store data by using a distributed data blockchain.

It should be noted that a consensus method for use in a miner node in a blockchain system according to an embodiment of the present disclosure is generally executed by the miner nodes 101, 102, 103, and accordingly, a consensus apparatus for use in a miner node in a blockchain system is generally provided in the miner nodes 101, 102, 103.

It should be understood that the numbers of miner nodes and networks in FIG. 1 are merely illustrative. Any numbers of miner nodes and networks may be provided as needed in implementation.

Figure 2A:
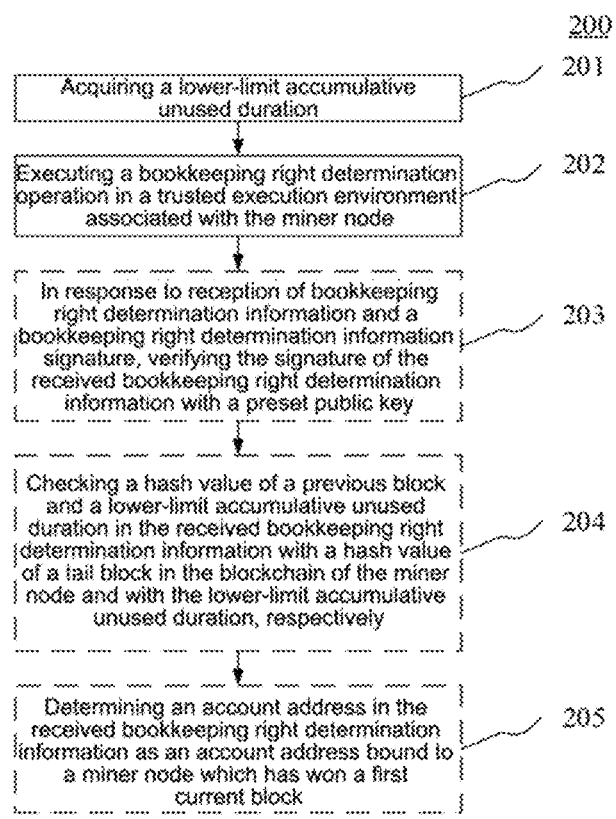
FIG. 2A is a flowchart of an embodiment of a consensus method for use in a miner node in a blockchain system according to the present disclosure.

With continued reference to FIG. 2A, a process 200 of an embodiment of a consensus method for use in a miner node in a blockchain system according to the present disclosure is shown. The consensus method for use in a miner node in a blockchain system includes the following steps.

In step 201, a lower-limit accumulative unused duration is acquired.

In this embodiment, an executor executing the consensus method (e.g., a miner node shown in FIG. 1) may acquire a predetermined lower-limit accumulative unused duration while competing for a bookkeeping right. Here, the lower-limit accumulative unused duration may be preset by a technician, or may be dynamically calculated and updated by said executor according to a block for which the miner nodes are competing.

In step 202, a bookkeeping right determination operation is executed in a trusted execution environment associated with the miner node.

In some optional implementations of this embodiment, the trusted execution environment associated with the miner node may be provided in the miner node.

In some optional implementations of this embodiment, the trusted execution environment associated with the miner node may be provided in another electronic device connected to the miner node over a network, and the miner node interacts with its associated trusted execution environment through a message communication mechanism.

Figure 2B:
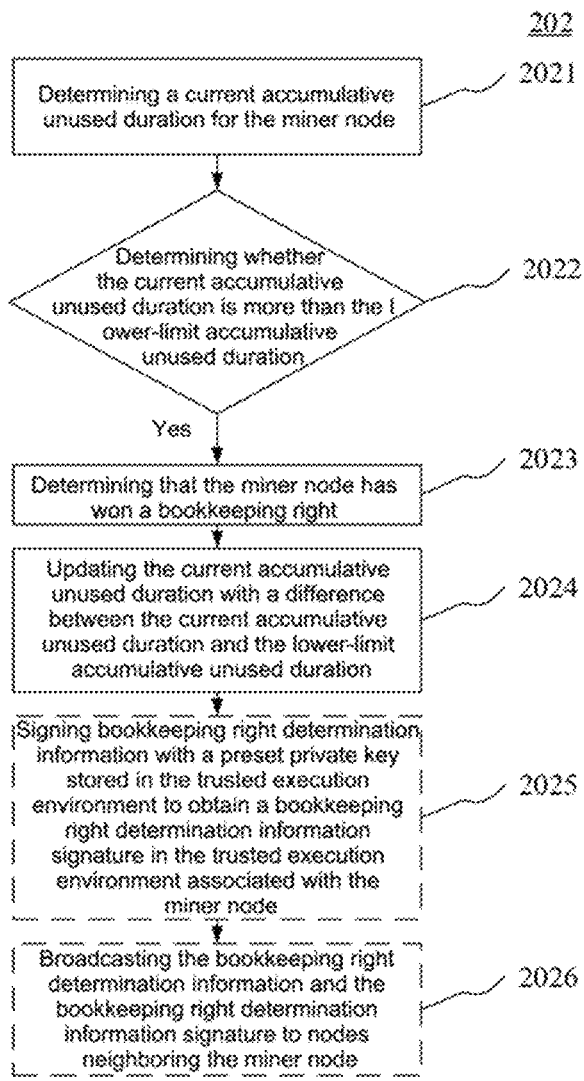
FIG. 2B is a subdivision flowchart of step 202 in the flowchart shown in FIG. 2A.

In this embodiment, said executor may execute a bookkeeping right determination operation in a trusted execution environment associated with the miner node. Here, the bookkeeping right determination operation may include sub-step 2021 to sub-step 2024 as shown in FIG. 2B.

In sub-step 2021, a current accumulative unused duration is determined for the miner node.

Here, said executor may be associated with a trusted execution environment. A clock may be set in the trusted execution environment. The clock set in the trusted execution environment is different from a clock set outside the trusted execution environment of said executor. The clock set in the trusted execution environment is accessible only by programs in the trusted execution environment, and is not accessible by programs outside the trusted execution environment.

In this way, said executor may determine the current accumulative unused duration for the miner node based on the current time of the clock set in the trusted execution environment in various implementable manners in the associated trusted execution environment.

In this embodiment, the trusted execution environment associated with the miner node may be set with an initial value of the current accumulative unused duration before it is sold. Then, while the miner node is competing for a bookkeeping right, a duration spent/elapsed from the start of the competition for the bookkeeping right to the current time of the clock set in the trusted execution environment will be accumulated into the current accumulative unused duration. For example, a change in the "current accumulative unused duration" may be controlled by a treating process (or called a background thread) continuously running in the trusted execution environment. For another example, in the execution of the sub-step 2021, a duration spent/elapsed from the start of the competition for the bookkeeping right to the current time of the clock set in the trusted execution environment may be determined first, and then the determined duration is accumulated into the current accumulative unused duration. Of course, the "current accumulative unused duration" in the trusted execution environment will not accumulate if the trusted execution environment associated with the miner node is only powered up, rather than being operated to compete for a bookkeeping right (commonly known as mining).

In some optional implementations of this embodiment, said executor may determine whether the current accumulative unused duration for the miner node is more than an upper-limit accumulative unused duration after executing sub-step 2021 and before executing sub-step 2022. If yes, the current accumulative unused duration is updated to the upper-limit accumulative unused duration. Here, the upper-limit accumulative unused duration may be manually set by a technician based on experience, or the upper-limit accumulative unused duration may be the product of the lower-limit accumulative unused duration and a preset coefficient greater than 1. In this way, it can be ensured that the current accumulative unused duration is less than or equal to the upper-limit accumulative unused duration described above. In other words, the current accumulative unused duration will not be excessively accumulated. Security can be improved by setting an upper limit for the current accumulative unused duration, because the number of bookkeeping rights consecutively gained by the same miner node due to any reason (e.g., the presence of a bug in software) will be limited.

In some optional implementations of this embodiment, a provider of trusted execution environments may randomly set a different initial value of the current accumulative unused duration for each of the trusted execution environments for sale. If the same initial value of the current accumulative unused duration is set for each of the trusted execution environments for sale, when the trusted execution environments are purchased in batches and start to compete for bookkeeping rights at the same time, a lot of miner nodes might have won bookkeeping rights in the same time period, and hence soft fork tends to occur.

In sub-step 2022, it is determined whether the current accumulative unused duration is more than a lower-limit accumulative unused duration.

In this embodiment, said executor may determine in the associated trusted execution environment whether the current accumulative unused duration is more than the lower-limit accumulative unused duration. If yes, the process goes to sub-step 2023.

In sub-step 2023, it is determined that the miner node has won the bookkeeping right.

In this embodiment, said executor may determine that the miner node has won the bookkeeping right, in the case where it is determined in the trusted execution environment that the current accumulative unused duration is more than the lower-limit accumulative unused duration.

It will be understood that said executor may start a bookkeeping operation after it is determined that it has won the bookkeeping right. The bookkeeping operation may be performed outside the associated trusted execution environment. Here, it should be noted that a bookkeeping process after a miner node in a public blockchain system has won a bookkeeping right may be performed by a well-known technology that has currently been widely studied and used, and therefore will not be described in detail here.

After the sub-step 2023 is executed, the execution goes to sub-step 2024.

In sub-step 2024, the current accumulative unused duration is updated with a difference between the current accumulative unused duration and the lower-limit accumulative unused duration.

In this embodiment, said executor may update the current accumulative unused duration with a difference between the current accumulative unused duration and the lower-limit accumulative unused duration in the associated trusted execution environment, after it is determined that it has won the bookkeeping right. In other words, winning of a bookkeeping right will cause consumption of the lower-limit accumulative unused duration from the current accumulative unused duration, so that it is ensured that the individual miner nodes in the blockchain system fairly compete for bookkeeping rights.

In some optional implementations of this embodiment, said executor may acquire a hash value of a block previous to a block ready for bookkeeping, before step 202 is executed. Here, a block of a miner node previous to a block ready for bookkeeping refers to the last block where bookkeeping has been completed, i.e., the most recent block where bookkeeping is completed, which has been saved in the local blockchain by the miner node. The hash value of the block may be obtained by querying the local blockchain.

Based on the optional implementations described above, in some optional implementations of this embodiment, said executor may execute the following sub-steps 2025 and 2026 after sub-step 2023 is executed.

In sub-step 2025, in the trusted execution environment associated with the miner node, bookkeeping right determination information is signed with a preset private key stored in the trusted execution environment to obtain a bookkeeping right information signature.

Said executor has determined in sub-step 2023 that the miner node has won the bookkeeping right. Hence, here, said executor may sign the bookkeeping right determination information with a preset private key stored in the trusted execution environment to obtain a bookkeeping right information signature, in the trusted execution environment associated with the miner node. Here, the bookkeeping right determination information may include: the hash value of the block previous to the block ready for bookkeeping, the lower-limit accumulative unused duration, and an account address bound to the miner node, where the account address bound to the miner node is stored in the trusted execution environment associated with the miner node.

Here, a preset key pair, including a preset private key and a preset public key, may be stored in the trusted execution environment associated with the miner node, wherein the preset private key is stored only in the trusted execution environment associated with the miner node, while the preset public key may be stored both in the trusted execution environment associated with the miner node and outside the trusted execution environment associated with the miner node.

Optionally, the bookkeeping right determination information may further include a real-name authentication identifier stored in the trusted execution environment associated with the miner node. Here, the real-name authentication identifier is used for representing whether the trusted execution environment associated with the miner node has passed a real-name authentication from a third-party organization.

Here, the process of real-name authentication of the miner node may be provided by a third-party organization. After the authentication has succeeded, the third-party organization will assign a real-name authentication identifier for this authentication and store the real-name authentication identifier in the authenticated trusted execution environment. The real-name authentication identifier may be used for query and verification. For example, the third-party organization may provide a website for public query and verification. When an authenticated account address (i.e., an account address bound to an authenticated trusted execution environment) and a real-name authentication identifier are input to the website, said website may feedback information for indicating whether the trusted execution environment has passed the real-name authentication. Said authenticated account address may be in a variant form of an account address, such as a hash value obtained from the account address. In practice, a real-name authentication identifier may include an organization code of an organization that provides the real-name authentication. When more than one third-party organization provides real-name authentication services for said blockchain system, the organization codes may be used for distinguishing the different third-party organizations. It will be understood that when a third-party organization provides real-name authentication, the authenticity of an entity to which the trusted execution environment belongs may be verified, and at most a specified number of (e.g., one) trusted execution environments can be authenticated for the same entity to which they belong. A blockchain system in which real-name authentication of miner nodes is strictly implemented will have higher credibility and security, because the real-name authentication can effectively guarantee a decentralized bookkeeping process. After the real-name authentication from the third-party organization has succeeded, the real-name authentication identifier may be safely stored in the authenticated trusted execution environment by existing technologies that have been widely studied and used, which therefore will not be described in detail here. For example, a signature of a relevant storage instruction instructing storage of the real-name authentication identifier in the trusted execution environment may be verified with a preset public key of the third-party organization in the trusted execution environment, and the storage is allowed only when the verification has succeeded.

Optionally, the miner node may have an additional function of validating online real-name mining. In other words, the miner node implements a real-name validation of a bookkeeping miner for each of the received blocks ready for bookkeeping. The block ready for bookkeeping is accepted only after the real-name validation has succeeded (it is not meant, by the term "accepted" here, that the block ready for bookkeeping will certainly be incorporated in the local blockchain of the miner node, because other validations may also be included), otherwise the block ready for bookkeeping will be discarded. As described previously, the third-party organization has provided a website on which a successful or unsuccessful real-name authentication of an account can be inquired based on an authenticated account address or a variant form of the account address and based on a real-name authentication identifier. Hence, it is only necessary for the miner node to obtain, from the block ready for bookkeeping, a real-name authentication identifier and an account address, or its variant form, of a miner that has gained this bookkeeping right, and make a query on the real-name authentication query website provided by the third-party organization. If the query result shows that the miner that has gained this bookkeeping right has passed the real-name authentication, the block ready for bookkeeping is accepted, otherwise the block ready for bookkeeping is discarded. In order to support the real-name validation process described above, after a block ready for bookkeeping is generated, the miner node may save, in the block (e.g., in a block header), information required for checking, including a real-name authentication identifier and an account address, or its variant form, of a miner that has gained the bookkeeping right in the block, and then the miner node may transmit the information by broadcasting the block or broadcast the information alone so that the information can be obtained by other miner nodes and used for real-name validation. Further, the above-mentioned query about real-name authentication of the same miner may be made by a miner node only once. The query result may be saved in a local database or in a file. There is no need to make a query on the real-name authentication website provided by the third-party organization every time.

It should be noted that the preset private key stored in the trusted execution environment and used for signature in sub-step 2025 may be implemented as a private key preset at the time of issuance, or may be implemented as a private key corresponding to an account address bound to the miner node (the account address may generally be in the form of a public key or its variant form). The latter may be generated when the miner account is created, and stored in the trusted execution environment. These two methods of obtaining a signature of the bookkeeping right determination information have the same effect under the premise of enabling real-name mining. Both of the methods ensure that the bookkeeping right determination information is true and not forged or faked. The two methods are different only in that, in the case of signing with a private key preset at the time of issuance, the unforgeability of the preset private key is ensured by the issuer of the trusted execution environment so as to verify the authenticity, while the authenticity is guaranteed by real-name authentication by an authoritative organization in the case of signing with a private key corresponding to the account address bound to the miner node. If the bookkeeping right determination information is signed by using a private key corresponding to the account address bound to the miner node, the signing process is performed in the trusted execution environment, so that no leakage of the private key information corresponding to the account address can be guaranteed.

Comparing the above two methods for implementation of private keys, the former method is implemented more simply, while the latter implementation method might be more secure. Because the same private key might be preset for the same model of trusted execution environments in the former method, the entire blockchain system may be brought into an insecure state once the private key is cracked. In the latter method, the private key is linked to an account address of a miner, thus only the current miner is affected and the security of the entire blockchain system is affected to a very limited extent even if the private key is cracked.

Further, the public and private keys are used in pair. Therefore, when the preset private key in sub-step 2025 is implemented by using one of the above two methods, a preset public key corresponding to the preset private key should be implemented in a corresponding manner. For example, if the preset private key is implemented as a private key corresponding to an account address bound to a miner node, a public key corresponding to the account address bound to the miner node may be recorded in the block header, so that each miner node may obtain the public key from the received block header broadcast by another miner node to verify the signature of the bookkeeping right determination information.

In sub-step 2026, the bookkeeping right determination information and the signature of the bookkeeping right determination information are broadcast to nodes neighboring the miner node.

Here, said executor has signed the bookkeeping right determination information through the associated trusted execution environment in sub-step 2025, then said executor may broadcast the bookkeeping right determination information and the signature of the bookkeeping right determination information determined in sub-step 2025 to nodes neighboring the miner node. It should be noted that said executor may first execute sub-step 2024 and subsequently execute sub-steps 2025 and 2026 after sub-step 2023 is executed, or may first execute sub-steps 2025 and 2026 and subsequently execute sub-step 2024 after sub-step 2023 is executed, which is not specifically limited in the present disclosure.

It should be noted that the steps 2021 to 2025 carried out in the trusted execution environment may be completed by calling an API provided by the trusted execution environment only once, rather than more than once. The steps 2021 to 2025 completed by one call to the API in the trusted execution environment may be regarded as a service provided by the trusted execution environment as a whole. This service may be remoted as the trusted execution environment device is migrated to a remote electronic device. As a security enhancing measure, the miner node may remotely call the service provided by the trusted execution environment, and an instruction (including parameters) initiated by the miner node and the obtained call result should be encrypted so as not to be intercepted, analyzed, or forged by an attacker in the message communication procedure to prevent an attack (i.e., a man-in-the-middle attack).

In some optional implementations of this embodiment, the trusted execution environment associated with the miner node may interact with the outside world in a ciphertext manner. In other words, when it is necessary for the miner node to execute an operation in the trusted execution environment, data to be processed corresponding to the operation to be executed and a corresponding operation instruction may be encrypted with a preset administrator public key and then transmitted to the trusted execution environment. Then, the trusted execution environment may decrypt the received data with a preset administrator private key to obtain the data to be processed and the corresponding operation instruction. Next, the corresponding operation instruction is executed with the decrypted data to be processed in the trusted execution environment, and an operation result is obtained. Finally, the obtained operation result is encrypted by the trusted execution environment and outputted from the trusted execution environment.

In some implementations, the obtained operation result may be encrypted by the trusted execution environment with a key included in the decrypted data to be processed.

In some implementations, the obtained operation result may be encrypted by the trusted execution environment with a preset key.

As an example, the obtained operation result encrypted by the trusted execution environment and then outputted from the trusted execution environment may be outputted to a memory or magnetic disk of the miner node, or sent to another electronic device connected to the miner node over a network (e.g., a routing node in the same chain as the miner node).

Based on the foregoing optional implementation, the step 202 may also be performed as follows.

First, an instruction corresponding to the bookkeeping right determination operation may be encrypted with a preset administrator public key to obtain the encrypted instruction.

Then, the obtained encrypted instruction may be decrypted, in the trusted execution environment associated with the miner node, with a preset administrator private key stored in the trusted execution environment associated with the miner node, to obtain the decrypted instruction.

Next, the decrypted instruction is executed to execute the bookkeeping right determination operation. For example, the bookkeeping right determination operation may include sub-step 2021 to sub-step 2024. Alternatively, the bookkeeping right determination operation may include sub-step 2021 to sub-step 2026.

Finally, the result of execution of the bookkeeping right determination operation is encrypted with a preset key stored in the trusted execution environment associated with the miner node and then outputted from the trusted execution environment associated with the miner node.

In practice, the trusted execution environment may provide other services, such as implementation of a particular signature, creation of a particular identity, generation of a random number, and the like, in addition to the service for the bookkeeping right determination operation. In these services, the incoming data to be processed and operation instructions and the outgoing operation results may also be encrypted in the manner described above. In the case where the trusted execution environment associated with the miner node is located in another electronic device connected to the miner node over a network, a process of communications in a ciphertext state will cause the holder of the trusted execution environment to be unable to accept calls to some services and refuse calls to some other services in a targeted manner, thereby achieving the technical effect that the multiple services offered by the trusted execution environment will be provided in a bundle form.

In some optional implementations of this embodiment, the step 202 may also be performed as follows.

The bookkeeping right determination operation is executed in the trusted execution environment associated with the miner node, in response to the fact that a random number used in a hash collision calculation based on the proof-of-work consensus mechanism meets a preset condition. In other words, it is necessary to firstly perform a hash collision calculation using PoW, and it will be determined whether the current accumulative unused duration for the miner node is more than the lower-limit accumulative unused duration only when a random number used in the hash collision calculation meets a preset condition. Here, the hash collision calculation in the blockchain and the determination of whether the random number used in the hash collision calculation meets a preset condition may be performed by existing technologies widely studied and used in the art, and therefore will not be described in detail here. As an example, determining whether the random number used in the hash collision calculation meets a preset condition may include the following steps.

First, a difficulty target value target=targetmax/difficulty is set in advance, where targetmax is a preset maximum difficulty value, and difficulty is a dynamically adjustable difficulty coefficient. The difficulty target value decreases as the difficulty coefficient increases.

Then, a hash value is calculated for a block currently competing for a bookkeeping right, where the hash value will vary with the value of the random number Nonce.

Next, it is determined whether the calculated hash value is less than the above-mentioned difficulty target value. If the calculated hash value is less than the above-mentioned difficulty target value, it may be determined that the random number Nonce used in the hash collision calculation meets the preset condition.

Here, the security of the blockchain system is enhanced by performing a hash collision calculation using PoW before determining whether the current accumulative unused duration for the miner node is more than the lower-limit accumulative unused duration. At least the following technical effects can be specifically achieved.

Firstly, if an attacker has prepared a certain number of miner nodes which is although much less than the required 51% of computing power, the attacker may postpone the execution of the step 202, namely, temporarily suspend the bookkeeping right determination operation, thereby resulting in a longer "current accumulative unused duration" in the trusted execution environment. When each of the miner nodes controlled by the attacker has a very long "accumulative unused duration", the attacker may allow these miner nodes, each having a long "accumulative unused duration", to start the execution of a bookkeeping right determination operation at the same time, to compete for bookkeeping rights. In this case, the attacker has a greatly increased chance of consecutively gaining bookkeeping rights, and 51% of computing power is created in a disguised manner. However, if the above-mentioned PoW consensus mechanism is superimposed before the bookkeeping right determination operation is executed in the trusted execution environment associated with the miner node, and the PoW is limited to being implemented with only CPU, it is still difficult for an attacker to consecutively gain bookkeeping rights with the PoW, because CPUs of the current prevailing computing devices do not have much different computing power, whereas GPUs (Graphics Processing Units) or ASICs (Application Specific Integrated Circuits) have exponentially different computing power. Here, the implementation of PoW with the only use of CPUs is known in the art. For example, a hash algorithm may be designed by using floating-point arithmetic instead (the GPU is not superior in floating-point arithmetic), and then the calculation process is performed depending on the memory space against the use of ASIC chips. Its technical details are not the technical focus of the present disclosure and therefore will not be discussed in detail here.

Secondly, the hardware of the trusted execution environments is provided by an official organization, thus there is a problem of how to prevent the official organization itself from cheating. A barrier to cheating by the official organization is actually raised by superimposing the PoW consensus mechanism. Assuming that there are 1,000 miner nodes in the blockchain system, the official organization has to use 1,001 equivalent devices to launch a 51% computing power attack, to which there is a high barrier. Such dual consensus mechanism superimposed with PoW is more likely to gain the public's trust.

It will be understood that a miner node may receive bookkeeping right determination information and signatures of the bookkeeping right determination information sent from other miner nodes, in addition to broadcasting bookkeeping right determination information and a signature of the bookkeeping right determination information to neighboring nodes. Therefore, in some optional implementations of this embodiment, said executor may also execute the following steps 203 to 205.

In step 203, in response to reception of bookkeeping right determination information and a signature of the bookkeeping right determination information, the signature of the received bookkeeping right determination information is verified with a preset public key.

Here, in the case where said executor has received bookkeeping right determination information and a signature of the bookkeeping right determination information broadcasted by another neighboring node, said executor may verify the signature of the received bookkeeping right determination information with a preset public key in the trusted execution environment or outside the trusted execution environment.

If the received bookkeeping right determination information signature is obtained by signing with a preset private key, the signature of the received bookkeeping right determination information will be successfully verified using a preset public key.

If the received bookkeeping right determination information signature is not obtained by signing with a preset private key, the signature of the received bookkeeping right determination information will not be successfully verified using a preset public key.

If the signature is successfully verified in step 203, said executor may go to the execution of step 204.

In step 204, a hash value of a previous block and a lower-limit accumulative unused duration in the received bookkeeping right determination information are checked with a hash value of a tail block in the blockchain of the miner node and with the lower-limit accumulative unused duration, respectively.

Here, in the case where the received bookkeeping right determination information and bookkeeping right determination information signature are successfully verified in step 203, said executor may check a hash value of a previous block and a lower-limit accumulative unused duration in the received bookkeeping right determination information with a hash value of a tail block in the blockchain of the miner node and with the lower-limit accumulative unused duration, respectively. If the checking succeeds, it is indicated that the bookkeeping right determination information is not forged by the miner node from which the received bookkeeping right determination information is sent, and then the process may go to step 205. If the checking fails, it is indicated that the bookkeeping right determination information is forged by the miner node from which the received bookkeeping right determination information is sent.

Here, the tail block in the blockchain of the miner node may be one of blocks of the miner node that have not been finalized (for example, the blocks that have not been finalized may refer to fewer than six later blocks in the blockchain of the miner node). For example, a miner node M1 has three unfinalized blocks B1, B2, and B3, and the blocks B1, B2, and B3 have hash values H1, H2, and H3, respectively. Then, in the execution of step 204, said executor may compare a hash value of a previous block in the received bookkeeping right determination information with said hash value H1, H2, and H3, respectively. If one of the hash values H1, H2, and H3 is the same as the hash value of the previous block in the received bookkeeping right determination information, it may be determined that the hash value of the previous block in the received bookkeeping right determination information is successfully checked.

In step 205, an account address in the received bookkeeping right determination information is determined as an account address bound to a miner node which has won a first current block.

Here, in the case where the received bookkeeping right determination information is successfully checked in step 204, said executor may determine an account address in the received bookkeeping right determination information as an account address bound to a miner node which has won a first current block. Here, the first current block is a block next to a block indicated by the hash value of the previous block in the received bookkeeping right determination information.

In the consensus method according to the foregoing embodiment of the present disclosure, the shortcoming of high power consumption caused by use of a proof-of-work consensus mechanism in a public blockchain is overcome by determining that a miner node has won a bookkeeping right in the case where it is determined in a trusted execution environment associated with the miner node that the current accumulative unused duration for the miner node is more than the lower-limit accumulative unused duration, namely, by using a time-dependent equal allocation mechanism.

Figure 3:
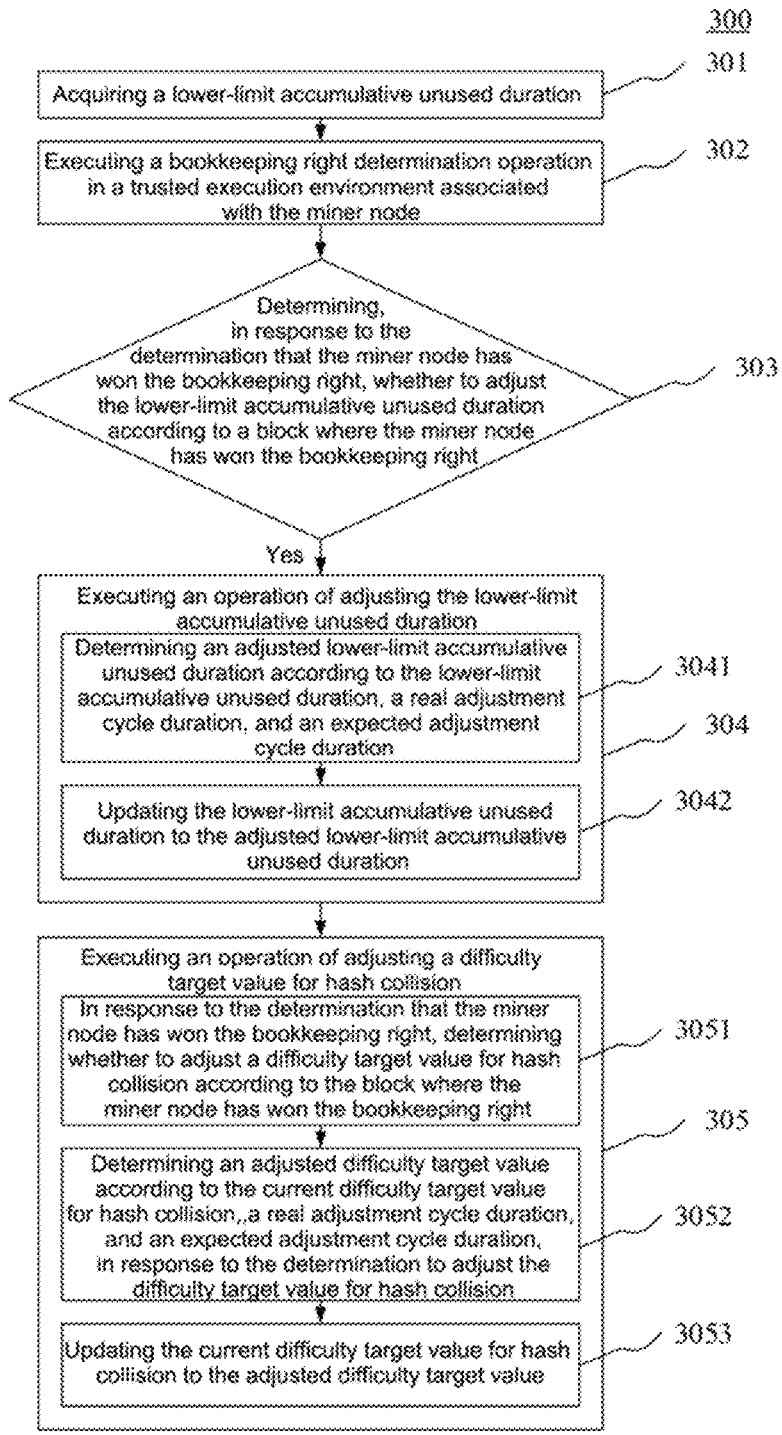
FIG. 3 is a flowchart of another embodiment of a consensus method for use in a miner node in a blockchain system according to the present disclosure.

On the basis of FIG. 2A, further reference is made to FIG. 3, which shows a process 300 of another embodiment of a consensus method for use in a miner node in a blockchain system according to the present disclosure. The process 300 of the consensus method includes the following steps.

In step 301, a lower-limit accumulative unused duration is acquired.

In step 302, a bookkeeping right determination operation is executed in a trusted execution environment associated with the miner node.

In this embodiment, the specific operations of step 301 and step 302 are substantially the same as the operations of step 201 and step 202 in the embodiment shown in FIG. 2A and therefore will not be described in detail here.

In step 303, in response to the determination that the miner node has won a bookkeeping right, it is determined, according to a block where the miner node has won the bookkeeping right, whether to adjust the lower-limit accumulative unused duration.

In this embodiment, in the case where it is determined that the miner node has won a bookkeeping right, an executor for executing the consensus method (e.g., a miner node shown in FIG. 1) may determine, according to a block where the miner node has won the bookkeeping right, whether to adjust the lower-limit accumulative unused duration. If it is determined to adjust the lower-limit accumulative unused duration, the execution goes to step 304.

In a public blockchain system, each block may be uniquely indicated by a block identifier. Here, said executor may determine, according to a block identifier of a block where the miner node has won the bookkeeping right, whether to adjust the lower-limit accumulative unused duration.

In some optional implementations of this embodiment, said executor may determine whether the block identifier of the block where the miner node has won the bookkeeping right falls within a preset set of block identifiers for adjustment of the lower-limit accumulative unused duration. If yes, it may be determined to adjust the lower-limit accumulative unused duration. Here, the preset set of block identifiers for adjustment of the lower-limit accumulative unused duration may be a set of block identifiers predetermined by a technician based on experience, each indicating the last block in each cycle (or period) of adjustment of the lower-limit accumulative unused duration.

In some optional implementations of this embodiment, said executor may determine whether there are N−1 (where N represents the preset number of blocks in a cycle) blocks between the block where the miner node has won the bookkeeping right and a block corresponding to the previous adjustment of the lower-limit accumulative unused duration. If yes, it may be determined to adjust the lower-limit accumulative unused duration. For example, if the preset number of blocks in a cycle is 1,008, the lower-limit accumulative unused duration is adjusted for every 1,008 blocks generated.

In step 304, an operation of adjusting the lower-limit accumulative unused duration is executed.

In this embodiment, said executor may execute an operation of adjusting the lower-limit accumulative unused duration, in the case where it is determined in step 303 to adjust the lower-limit accumulative unused duration. Here, the operation of adjusting the lower-limit accumulative unused duration may include the following sub-steps 3041 to 3042.

In sub-step 3041, an adjusted lower-limit accumulative unused duration is determined according to the lower-limit accumulative unused duration, a real adjustment cycle duration, and an expected adjustment cycle duration.

In this embodiment, said executor may determine an adjusted lower-limit accumulative unused duration according to the lower-limit accumulative unused duration, a real adjustment cycle duration, and an expected adjustment cycle duration in various implementable manners.

Here, the real adjustment cycle duration is a duration between the timing of generation of the block where the miner node has won the bookkeeping right and the timing of generation of a block corresponding to the previous adjustment of the lower-limit accumulative unused duration in the blockchain of the miner node. In other words, the real adjustment cycle duration is an actual waiting duration between two successive adjustments of the lower-limit accumulative unused duration for the miner node.

Here, the expected adjustment cycle duration may be an expected duration between two successive adjustments of the lower-limit accumulative unused duration that is preset by a technician based on experience. For example, assuming that the lower-limit accumulative unused duration is adjusted once for every 1,008 blocks generated, namely, 1,008 blocks are generated during an adjustment cycle, and then assuming that it is expected to generate a block every 5 minutes on average, the expected adjustment cycle duration may be set to be 5,040 (i.e., 5×1008=5040) minutes.

The number of miner nodes in a blockchain is dynamically changing. Thus, when the number of miner nodes increases considerably in the current cycle of adjustment of the lower-limit accumulative unused duration, the real adjustment cycle duration for the blockchain, i.e., the actual waiting duration between two successive adjustments of the lower-limit accumulative unused duration, will become shorter (because more miner nodes participate in a competition for a bookkeeping right, it is easier to complete the competition in a duration less than the expected duration). On the contrary, when the number of miner nodes decreases considerably in the current cycle of adjustment of the lower-limit accumulative unused duration, the real adjustment cycle duration, i.e., the actual waiting duration between two successive adjustments of the lower-limit accumulative unused duration, will become longer. The adjusted lower-limit accumulative unused duration may be positively correlated with the lower-limit accumulative unused duration and with the expected adjustment cycle duration, and the adjusted lower-limit accumulative unused duration may be negatively correlated with the real adjustment cycle duration, in order to generate a preset number N of blocks within an expected adjustment cycle duration T in the blockchain system as far as possible, namely, to generate one block per duration t on average, where t=T÷N.

Optionally, the adjusted lower-limit accumulative unused duration may be calculated according to the lower-limit accumulative unused duration, the real adjustment cycle duration, and the expected adjustment cycle duration in accordance with the following formula:

$$T'_{min} = \frac{T_{min}T_{exp}}{T_{real}} = \frac{T_{min}T_{exp'}}{T_{real}} = \frac{T_{min}T_{exp}}{T_{real}} \quad (1)$$

$T_{min}$ is the lower-limit accumulative unused duration;
$T_{exp}$ is the expected adjustment cycle duration;
$T_{real}$ is the real adjustment cycle duration;
$T_{min}'$ is the calculated adjusted lower-limit accumulative unused duration.

Optionally, the adjusted lower-limit accumulative unused duration may also be calculated according to the lower-limit accumulative unused duration, the real adjustment cycle duration, and the expected adjustment cycle duration in accordance with the following formula:

$$T'_{min} = \frac{\alpha T_{min}T_{exp} + \beta}{\gamma T_{real} + \theta} T'_{min} = \frac{\alpha T_{min}T_{exp} + \beta}{\gamma T_{real} + \theta} \quad (2)$$

where
$T_{min}$ is the lower-limit accumulative unused duration;
$T_{exp}$ is the expected adjustment cycle duration;
$T_{real}$ is the real adjustment cycle duration;
$\alpha$, $\beta$, $\gamma$, and $\theta$ are preset constants;
$T_{min}'$ is the calculated adjusted lower-limit accumulative unused duration.

In sub-step 3042, the lower-limit accumulative unused duration is updated to the adjusted lower-limit accumulative unused duration.

In this embodiment, said executor may update the lower-limit accumulative unused duration for the miner node to the adjusted lower-limit accumulative unused duration calculated in sub-step 3041.

If an optional implementation of superimposing a PoW consensus mechanism in the embodiment shown in FIG. 2A is used in the execution of step 302 by said executor, said executor may further execute the following step 305 in some optional implementations of this embodiment.

In step 305, an operation of adjusting a hash collision difficulty target value is executed.

Here, the operation of adjusting a hash collision difficulty target value may include the following sub-steps 3051 to 3053.

In sub-step 3051, in response to the determination that the miner node has won the bookkeeping right, it is determined, according to the block where the miner node has won the bookkeeping right, whether to adjust a difficulty target value for hash collision.

In some optional implementations of this embodiment, said executor may determine whether the block identifier of the block where the miner node has won the bookkeeping right falls within a preset set of block identifiers for adjustment of the hash collision difficulty target value. If yes, it may be determined to adjust the difficulty target value for hash collision. Here, the preset set of block identifiers for adjustment of the hash collision difficulty target value may be a set of block identifiers predetermined by a technician based on experience, each indicating the last block in each cycle of adjustment of the hash collision difficulty target value.

In some optional implementations of this embodiment, said executor may determine whether there are N−1 (where N represents the preset number of blocks in a cycle) blocks between the block where the miner node has won the bookkeeping right and a block corresponding to the previous adjustment of the hash collision difficulty target value. If yes, it may be determined to adjust the hash collision difficulty target value. For example, if the preset number of blocks in a cycle is 1,008, the hash collision difficulty target value is adjusted for every 1,008 blocks generated.

In sub-step 3052, in response to the determination to adjust the difficulty target value for hash collision, an adjusted difficulty target value is determined according to the current difficulty target value for hash collision, a real adjustment cycle duration, and an expected adjustment cycle duration.

Here, the adjusted difficulty target value is positively correlated with the current difficulty target value for hash collision and with the real adjustment cycle duration, and the adjusted difficulty target value is negatively correlated with the expected adjustment cycle duration. The specific method for calculating the adjusted difficulty target value is substantially the same as the method for calculating the adjusted lower-limit accumulative unused duration described in sub-step 2041 and therefore will not be described in detail here.

In sub-step 3053, the current difficulty target value for hash collision is updated to the adjusted difficulty target value.

It will be understood that it is optional whether to superimpose the PoW consensus mechanism on the POET consensus mechanism which has been used in said blockchain system. If it is chosen not to superimpose the PoW consensus mechanism, sub-steps 3051 to 3053 may be omitted.

It can be seen from FIG. 3 that the process 300 of the consensus method for use in a miner node in a blockchain system in this embodiment has an additional step of adjusting the lower-limit accumulative unused duration, as compared with the embodiment corresponding to FIG. 2A. Thus, at least the following technical effects can be achieved by the solution described in this embodiment. When the number of miner nodes in the blockchain changes, the lower-limit accumulative unused duration is adjusted in real time to adapt to the dynamic change in the number of miner nodes, so that it is ensured as far as possible that a number of blocks generated within a preset expected cycle duration in the blockchain system is preset number. In a PoET consensus mechanism currently used in a consortium blockchain, a waiting duration is randomly specified by means of a CPU for competition for a bookkeeping right instead of the proof-of-work consensus mechanism. Such consensus method fails to support the dynamic adjustment of the difficulty of competing for bookkeeping rights. In contrast, the process 300 of the consensus method for use in a miner node in a blockchain system shown in FIG. 3 allows an adjustment of the difficulty of competing for bookkeeping rights by adjusting the lower-limit accumulative unused duration. For example, the difficulty of competing for bookkeeping rights is increased by increasing the lower-limit accumulative unused duration, whereas the difficulty of competing for bookkeeping rights is reduced by decreasing the lower-limit accumulative unused duration.

Figure 4:
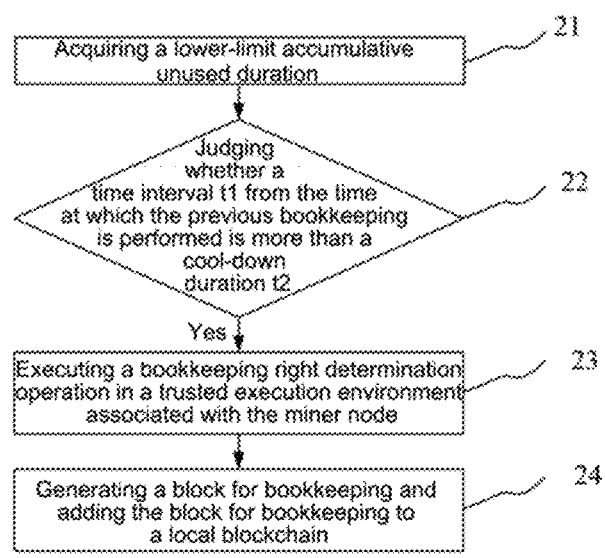
FIG. 4 is a flowchart of yet another embodiment of a consensus method for use in a miner node in a blockchain system according to the present disclosure.

On the basis of FIG. 2A, further reference is made to FIG. 4, which shows a process 20 of another embodiment of a consensus method for use in a miner node in a blockchain system according to the present disclosure. The process 20 of the consensus method includes the following steps.

In step 21, a lower-limit accumulative unused duration is acquired.

In this embodiment, the specific operation of step 21 is substantially the same as the operation of step 201 in the embodiment shown in FIG. 2A, and the similar parts will not be described repeatedly.

In step 22, it is judged whether a time interval t1 from the time at which the previous bookkeeping is performed in a trusted execution environment associated with the miner node is more than a cool-down duration t2, wherein the cool-down duration t2 is k times the lower-limit accumulative unused duration, where k is a constant greater than 0 and less than 1.

In some embodiments, the trusted execution environment associated with the miner node which has gained a bookkeeping right can immediately participate in the next competition for a bookkeeping right without restriction. In other implementations, the trusted execution environment associated with the miner node which has gained a bookkeeping right will voluntarily become idle for a period of time during which it does not participate in a competition for a bookkeeping right, before participating in a competition for a bookkeeping right again. The period of time during which the trusted execution environment associated with the miner node is idle is called a cool-down duration. The cool-down duration may be set to be k times the lower-limit accumulative unused duration (k is a constant greater than 0 and less than 1).

In an implementation, it is judged, by an application built in the trusted execution environment associated with the miner node, whether it should become idle. During the period during which the trusted execution environment associated with the miner node is idle, even if the miner node calls an interface for competition for bookkeeping rights that is provided by the trusted execution environment, the trusted execution environment associated with the miner node does not respond to the call, or replies with a prompt message to inform the miner node that it is still in the cool-down period. In another implementation, the miner node records the time of the previous successful bookkeeping, and judges (i.e., judges outside the trusted execution environment) whether a time interval between the current time and the time at which the previous successful bookkeeping is performed in the trusted execution environment associated with the miner node exceeds the cool-down duration. If no, the interface for competition for bookkeeping rights provided by the trusted execution environment associated with the miner node will not be invoked, otherwise the interface may be invoked.

Here, the successful bookkeeping in the trusted execution environment associated with the miner node refers to the successful bookkeeping performed by the miner node after the trusted execution environment associated with the miner node has won the bookkeeping right.

It should be noted that the judgment process performed by the miner node is independent of the voluntary idling of the trusted execution environment associated with the miner node. Even if the trusted execution environment associated with the miner node, which has competed for and gained a bookkeeping right, does not voluntarily become idle (including a case of intentional cheating or a case where it originally does not have this function), the miner node still may execute the step 22 to disable its associated trusted execution environment from gaining a bookkeeping right again within the cool-down duration after it has gained a bookkeeping right.

Optionally, the miner node judges whether a time interval t1 from the time at which the previous bookkeeping is performed in the associated trusted execution environment is more than a cool-down duration t2, where t2 is k times the lower-limit accumulative unused duration (k is a constant greater than 0 and less than 1), and the lower-limit accumulative unused duration is calculated according to a difficulty target value. If the judgment result is "Yes", it is indicated that the trusted execution environment associated with the miner node has passed the cool-down period and is allowed to perform bookkeeping again, and the execution of the subsequent steps is continued. Otherwise, the subsequent steps are not executed. Alternatively, in some implementations, if the judgment result is "No", the miner node may calculate a time interval t3 to a time at which the associated trusted execution environment can participate in the next competition for a bookkeeping right, where t3 may be obtained by t2−t1. This means that no competition for a bookkeeping right is performed temporarily until the time interval from the previous bookkeeping in the trusted execution environment associated with the miner node exceeds the cool-down duration.

The verification described above allows a miner node to prevent an attacker from deliberately hoarding accumulative unused durations in trusted execution environments associated with miner nodes by some means and then releasing the computing power in a short period of time to gain consecutive bookkeeping rights and make a disguised 51% computing power attack, because any of trusted execution environments associated with miner nodes participating in mining cannot avoid being restricted by the cool-down duration. Moreover, setting of the restrictive cool-down duration enables more trusted execution environments associated with miner nodes to have the opportunity to gain bookkeeping rights, by which the fairness of mining is reflected to a certain extent.

The time interval from the time at which the previous bookkeeping is performed in the trusted execution environment associated with the miner node is obtained by the timing of the current bookkeeping minus the timing of the previous bookkeeping, where the timing of the current bookkeeping may be the time indicated by a timestamp in a block header of a block where the trusted execution environment associated with the miner node has won the bookkeeping right, and the timing of the previous bookkeeping may be the time indicated by a timestamp in a block header of a block generated in the previous bookkeeping. On the one hand, according to the existing blockchain protocol, a timestamp in a block header can only roughly represent the bookkeeping timing (it is acceptable if it is not earlier or later than the current network time by 2 hours), thus the bookkeeping time interval calculated by directly using this method has a larger error. On the other hand, a timestamp is determined by a miner node, thus it is not excluded that someone deliberately advances or delays the bookkeeping time. Both of the factors might result in low verification accuracy and credibility in step 22.

Therefore, in some implementations, said bookkeeping time interval may be estimated by using the following formula:

$$t1=(\text{Height2}-\text{Height1})\cdot \bar{t}$$

where Height2 is the height of a block in the blockchain where the trusted execution environment associated with the miner node has won the bookkeeping right, Height1 is the height of a block generated by the previous bookkeeping in the blockchain, and $\bar{t}$ is a preset constant for the blockchain system for representing an average time required for generating a block in the blockchain system (the average time spent for generating one block). Here, the height of a block in a blockchain refers to the total number of blocks previous to this block that are connected together in the blockchain. An initial block has a height of 0 because it is preceded by no block. A bookkeeping time interval of two blocks is estimated with higher accuracy and credibility by using a difference between the heights of the blocks. During specific implementation, the heights of the blocks may be obtained by querying the blockchain data stored by the miner node.

As an optional solution, several miner nodes acting as stabilizers may be provided in a blockchain system (if multiple parallel chains are used in the blockchain system, each of the parallel chains may be provided with several stabilizers). Trusted execution environments associated with these miner nodes participate in competition for bookkeeping rights only when none of trusted execution environments associated with other miner nodes has won bookkeeping rights over a long time (e.g., several times the average block generation time), and they are not restricted by the cool-down duration so as to avoid a too long bookkeeping time interval of a few blocks. Here, the timings of generation of blocks in the blockchain may be sent to the miner nodes acting as stabilizers. The miner nodes may be determined, according to a difference between the current time and the time at which the latest confirmed block is generated in the blockchain, whether to allow the trusted execution environments associated with the miner nodes acting as stabilizers to compete for bookkeeping right.

The inventor has discovered in long-term practice that in a few cases, for example, in a case where there are not many miner nodes participating in mining, and most of the miner nodes are offline due to reasons such as network failures and only a few miner nodes are still mining, the number of blocks in the blockchain may be caused to stop growing, because all of the trusted execution environments associated with the miner nodes may not be able to meet the requirement of estimating a cool-down duration using a height difference in step 22. In other words, for all of the trusted execution environments associated with the miner nodes that are still online, Height2−Height1 will no longer change and thus the estimated t1 is always not greater than t2.

To solve this problem, in some implementations, a verification rule may be added to miner nodes. If the lower-limit accumulative unused duration saved in a miner node is less than a certain preset value (which is, for example, twice the minimum lower-limit accumulative unused duration), it is also deemed to meet the requirement concerning the cool-down duration, and the execution of the subsequent steps is continued. It is meant, by the lower-limit accumulative unused duration less than a preset value, that the difficulty of mining in the current chain is too low. If this condition is met, it is indicated that the number of blocks in the current blockchain has stopped growing, and the miner node should be allowed to perform bookkeeping so that a block can be added normally. Correspondingly, a judgment may be added in the trusted execution environment associated with the miner node. For example, if the accumulative unused duration in the trusted execution environment associated with the miner node has exceeded a preset multiple (e.g., double) of the lower-limit accumulative unused duration, and the lower-limit accumulative unused duration is less than a certain preset value (which is, for example, twice the minimum lower-limit accumulative unused duration), it is also deemed to meet the requirement concerning the cool-down duration, and the trusted execution environment associated with the miner node will no long continue idling. Moreover, the judgment is executed in the trusted execution environment associated with the miner node, and the judgment process cannot be interfered or forged by external factors, therefore the judgment is true and credible.

It will be understood that if the above verification rule is not added to the miner node or to its associated trusted execution environment, step 22 may also be executed before step 21, because the lower-limit accumulative unused duration will not be used in the execution of step 22.

Figure 5:
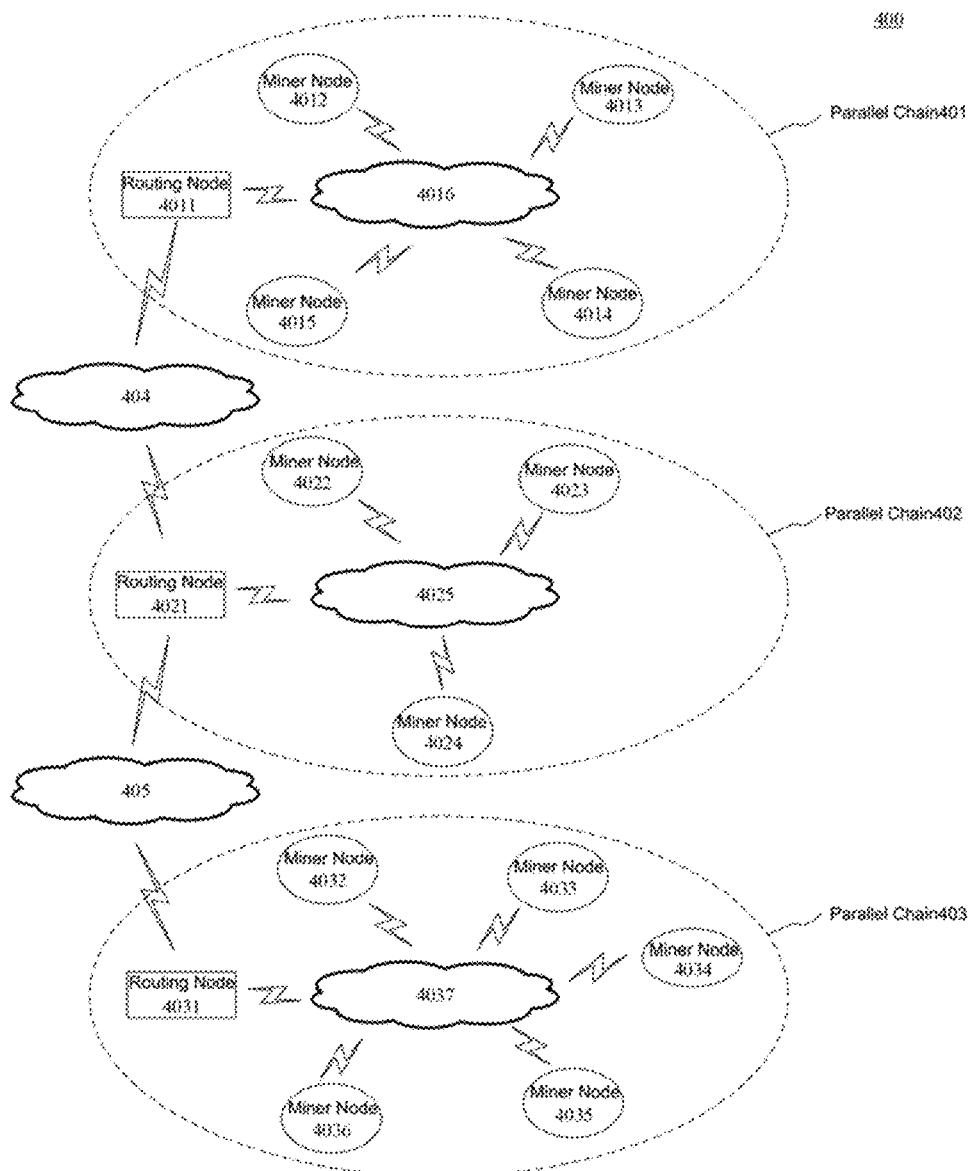
FIG. 5 is a diagram of an exemplary system architecture of an embodiment of a blockchain system according to the present disclosure.

Further, if a trusted execution environment associated with a certain miner node participates in mining for the first time, or has just switched to another parallel chain for mining (for example, because of the expansion of the blockchain system), data corresponding to the height of a block in the blockchain that is generated in the previous successful bookkeeping cannot be found because only data associated with a parallel chain in which the trusted execution environment associated with the miner node undergoes currently mining is queried for the height of the block. Therefore, it is also deemed to have met the requirement concerning the cool-down duration. Reference can be made to FIG. 5 for the parallel chain mentioned above.

In step 23, a bookkeeping right determination operation is executed in the trusted execution environment associated with the miner node.

In this embodiment, the specific operation of step 23 is substantially the same as the operation of step 202 in the embodiment shown in FIG. 2A, and the similar parts will not be described repeatedly. In some implementations, the trusted execution environment associated with the miner node judges whether it can gain a bookkeeping right, by judging whether the accumulative unused duration falls within a period of an integral multiple of the cool-down duration, in addition to judging whether the accumulative unused duration exceeds the lower-limit accumulative unused duration. If both of the judgment results are "Yes", it is confirmed to have gained the bookkeeping right, otherwise it has failed in the competition for the bookkeeping right. For example, if the lower-limit accumulative unused duration is 2 days, and k is 0.5, then the cool-down duration is 1 day, and an integral multiple of the cool-down duration is 1 day, 2 days, or 3 days, for example. A period of an integral multiple of the cool-down duration is defined as an integral multiple of the cool-down duration plus a fault-tolerant deviation time (e.g., 20 minutes). Under this definition, the period of the integral multiple of the cool-down duration is from 1 day to 1 day and 20 minutes, from 2 days to 2 days and 20 minutes, from 3 days to 3 days and 20 minutes, for example. In a possible scenario, when an attacker has control of a certain number of miner nodes, trusted execution environments associated with these miner nodes are caused to compete for bookkeeping rights at some particular time points in a concentrated manner, so that the computing power is concentrated in time to create a disguised 51% computing power attack. The additional judgment described above is intended to force the trusted execution environments associated with the miner nodes to compete for bookkeeping rights at dispersed time points, thereby avoiding the concentration of computing power and ensuring the security of the blockchain system.

In step 24, a block ready for bookkeeping is generated and the block ready for bookkeeping is added to a local blockchain.

After the miner node has won the bookkeeping right in its associated trusted execution environment, a block ready for bookkeeping is generated (in some implementations, a block ready for bookkeeping may be generated prior to competition for a bookkeeping right, but the block ready for bookkeeping generated at this time does not contain complete information, and some information may be added to the block ready for bookkeeping, for example, an account address of a bookkeeping miner or its variant form or the like may be added to the block header, after the competition for the bookkeeping right succeeds) and incorporated into the local blockchain. In addition, the block ready for bookkeeping will be broadcast by the miner node to neighboring nodes and finally broadcast over the entire network. Therefore, the current miner node will also receive blocks ready for bookkeeping that are broadcast from other miner nodes in the same chain. In some implementations, the current miner node will check the legitimacy of these blocks ready for bookkeeping, which will also be incorporated into the local blockchain after they are successfully checked.

In some implementations, the miner node may verify whether a bookkeeping behavior in a block ready for bookkeeping that is broadcast from another miner node meets the requirement concerning the cool-down duration, and then determine whether to approve the block. The judgment method is similar to that in step 22 and is repeated simply here. Reference can be made to step 22 for details.

First, the miner node acquires an account address of a miner that has won the bookkeeping right in a block ready for bookkeeping. The account address is bound to a trusted execution environment that has won the bookkeeping right, and may be recorded in the block ready for bookkeeping. It should be understood that a variant form of the account address is also available.

Then, the miner node queries for the height of a block generated in the previous bookkeeping by the miner in the blockchain according to the account address of the miner. In order to speed up the progress of the query, in some implementations, the miner node may separately save the height of each block in the blockchain and an address entity of a wallet account in a block header into a database of the miner node.

Next, the miner node determines a time interval between the time at which the block ready for bookkeeping is generated and the time at which the block is generated in the previous bookkeeping, according to the height of the block generated in the previous bookkeeping in the blockchain and to the height of the block ready for bookkeeping in the blockchain. The time interval may be specifically estimated by using a formula with reference to step 22.

Finally, the miner node judges whether the time interval is more than a cool-down duration. If it is more than the cool-down duration, the block ready for bookkeeping is approved. For example, it may be added to the local blockchain for further confirmation (undergoing other checking operations). Otherwise, the block will not be approved and may be discarded directly. Here, the cool-down duration is k times the lower-limit accumulative unused duration, and k is a constant greater than 0 and less than 1.

Similarly to step 22, in some implementations, if a lower-limit accumulative unused duration (or its equivalent form) corresponding to when a block ready for bookkeeping is mined is recorded in the block header of the block ready for bookkeeping, a verification rule may be added to the miner node. If the lower-limit accumulative unused duration recorded in the block header of the block ready for bookkeeping is less than a certain preset value (which is, for example, twice the minimum lower-limit accumulative unused duration), it will also be deemed to meet the requirement concerning the cool-down duration, and the cool-down duration is no longer estimated from the heights of the blocks.

Similarly to step 22, if a bookkeeping miner for a block ready for bookkeeping participates in mining for the first time, or has just switched to the current parallel chain for mining (for example, because of the expansion of the blockchain system), it is impossible to obtain the height of the block generated during the previous successful bookkeeping in the blockchain because there is no record of the previous mining by the bookkeeping miner in the current parallel chain. Therefore, it is also deemed to have met the requirement concerning the cool-down duration. Reference can be made to FIG. 5 for the parallel chain mentioned above.

Referring now to FIG. 5, FIG. 5 shows an exemplary system architecture 400 of an embodiment of a blockchain system according to the present disclosure.

As shown in FIG. 5, the system architecture 400 may include parallel chains 401, 402, and 403 and networks 404 and 405.

The network 404 acts as a medium for providing a communication link between a routing node 4011 and a routing node 4021. The network 404 may include various connection types, for example, wired and wireless communication links, or optic cables, or the like.

The network 405 acts as a medium for providing a communication link between the routing node 4021 and a routing node 4031. The network 405 may include various connection types, for example, wired and wireless communication links, or optic cables, or the like.

The parallel chain 401 includes a routing node 4011, miner nodes 4012, 4013, 4014, and 4015, and a network 4016. The network 4016 acts as a medium for providing communication links between the routing node 4011 and the miner nodes 4012, 4013, 4014, and 4015. The network 4016 may include various connection types, for example, wired and wireless communication links, or optic cables, or the like. The miner nodes 4012, 4013, 4014, and 4015 of the parallel chain 401 store data by using a distributed data blockchain.

The parallel chain 402 includes a routing node 4021, miner nodes 4022, 4023, and 4024, and a network 4025. The network 4025 acts as a medium for providing communication links between the routing node 4021 and the miner nodes 4022, 4023, and 4024. The network 4025 may include various connection types, for example, wired and wireless communication links, or optic cables, or the like. The miner nodes 4022, 4023, and 4024 of the parallel chain 402 store data by using a distributed data blockchain.

The parallel chain 403 includes a routing node 4031, miner nodes 4032, 4033, 4034, 4035, and 4036, and a network 4037. The network 4037 acts as a medium for providing communication links between the routing node 4031 and the miner nodes 4032, 4033, 4034, 4035, and 4036. The network 4037 may include various connection types, for example, wired and wireless communication links, or optic cables, or the like. The miner nodes 4032, 4033, 4034, 4035, and 4036 of the parallel chain 403 store data by using a distributed data blockchain.

Users may use the miner nodes 4012, 4013, 4014, and 4015 to interact with the routing node 4011 through the network 4016 to receive or send messages or the like.

Users may also use the miner nodes 4022, 4023, and 4024 to interact with the routing node 4021 through the network 4025 to receive or send messages or the like.

Users may also use the miner nodes 4032, 4033, 4034, 4035, and 4036 to interact with the routing node 4031 through the network 4037 to receive or send messages or the like.

Various communication client applications, such as blockchain bookkeeping applications, digital currency wallet applications, web browser applications, shopping applications, search applications, instant messaging tools, email clients, social platform software, and the like, may be installed on the miner nodes 4012, 4013, 4014, 4015, 4022, 4023, 4024, 4032, 4033, 4034, 4035, and 4036. Users may use the digital currency wallet applications installed on the miner nodes 4012, 4013, 4014, 4015, 4022, 4023, 4024, 4032, 4033, 4034, 4035, and 4036 to implement operations such as management, transfer, and reception of a digital currency, checking of the balance, and checking of transaction records. Users may also use the blockchain bookkeeping applications installed on the miner nodes 4012, 4013, 4014, 4015, 4022, 4023, 4024, 4032, 4033, 4034, 4035, and 4036 to implement competitions for bookkeeping rights in the parallel chains where the miner nodes are located and to implement bookkeeping operations. All the miner nodes 4012, 4013, 4014, 4015, 4022, 4023, 4024, 4032, 4033, 4034, 4035, and 4036 are bound with account addresses (for example, the account addresses may be bound by using digital currency wallet applications).

It should be noted that the routing nodes 4011, 4021, and 4031 may be hardware or software. When the routing nodes 4011, 4021, and 4031 are hardware, each of them may be implemented as a distributed server cluster consisting of multiple servers, or as a single server. When the routing nodes 4011, 4021, and 4031 are software, each of them may be implemented as multiple software or software modules (for providing routing services, for example), or may be implemented as a single software or software module. They are not specifically limited here.

It should be noted that the miner nodes 4012, 4013, 4014, 4015, 4022, 4023, 4024, 4032, 4033, 4034, 4035, and 4036 may be hardware or software. When the miner nodes 4012, 4013, 4014, 4015, 4022, 4023, 4024, 4032, 4033, 4034, 4035, and 4036 are hardware, each of them may be implemented as a distributed server cluster consisting of multiple servers, or as a single server. When the miner nodes 4012, 4013, 4014, 4015, 4022, 4023, 4024, 4032, 4033, 4034, 4035, and 4036 are software, each of them may be implemented as multiple software or software modules (for providing services for competition for bookkeeping rights and bookkeeping services, for example), or may be implemented as a single software or software module. They are not specifically limited here.

The miner nodes 4012, 4013, 4014, 4015, 4022, 4023, 4024, 4032, 4033, 4034, 4035, and 4036 may be associated with trusted execution environments, and the miner nodes 4012, 4013, 4014, 4015, 4022, 4023, 4024, 4032, 4033, 4034, 4035, and 4036 may implement the consensus method in the embodiment shown in FIG. 2A, or implement the consensus method in the embodiment shown in FIG. 3, or implement the consensus method in the embodiment shown in FIG. 4. It should be noted that a trusted execution environment associated with a miner node may be provided in the miner node. Alternatively, a trusted execution environment associated with a miner node may be provided in another electronic device connected to the miner node over a network. In this way, a miner node may interact with its associated trusted execution environment by means of a message communication mechanism (such as TCP/IP). For example, for trusted execution environment devices in the form of USB interfaces, there are developed technologies such as USB over Network in the industry. Such technology allows a trusted execution environment plugged into a USB port of an electronic device connected to a miner node over a network to be equivalent to being plugged into and used in the local machine of the miner node.

It should be noted that, in some cases, the parallel chains may also include SPV (Simplified Payment Verification) nodes, on which various communication client applications, such as simplified payment verification applications, digital currency wallet applications, web browser applications, shopping applications, search applications, instant messaging tools, email clients, social platform software, and the like, may be installed. Users may use the simplified payment verification applications installed on the SPV nodes to implement operations such as management, transfer, and reception of a digital currency, checking of the balance, and checking of transaction records.

It should be understood that the number of parallel chains in FIG. 5 is merely illustrative. Any number of parallel chains may be provided as needed in implementation. The numbers of routing nodes, miner nodes, and networks in each parallel chain are also merely illustrative. Any numbers of routing nodes, miner nodes, and networks may be provided as needed in implementation.

Figure 6A:
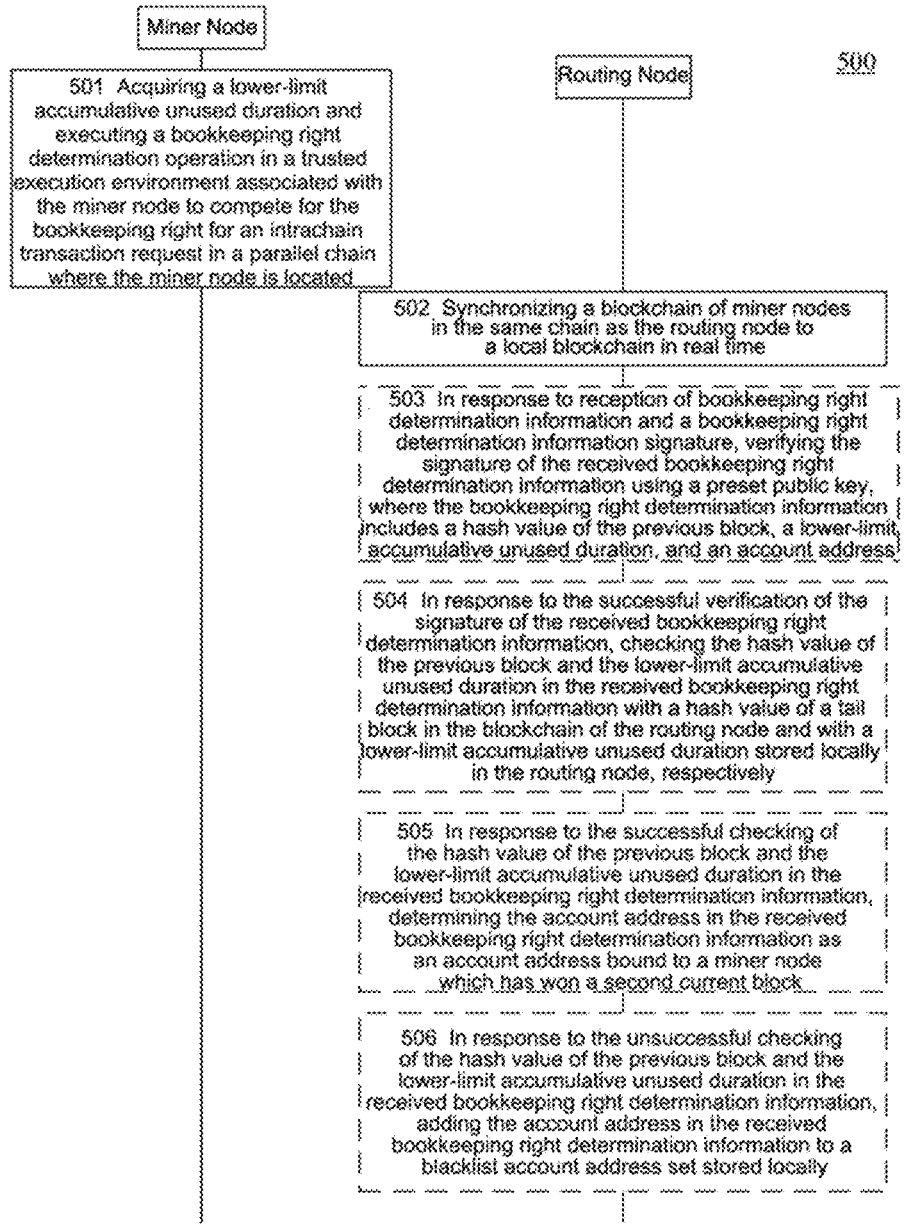
FIGS. 6A and 6B are timing sequence diagrams of an embodiment of a blockchain system according to the present disclosure.
Figure 6B:
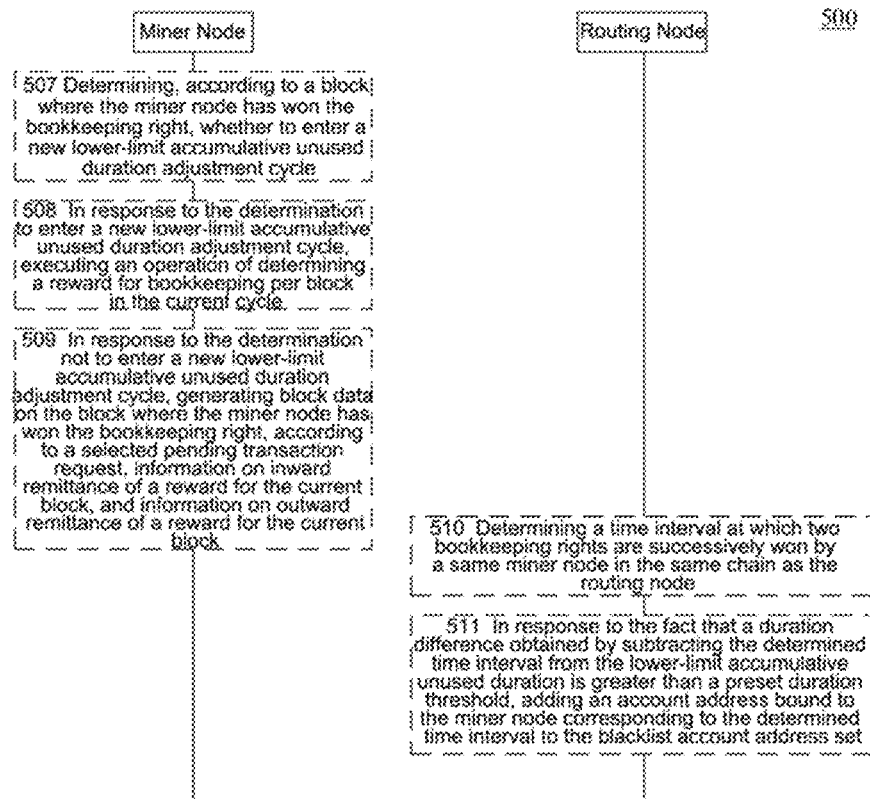
Figure 6C:
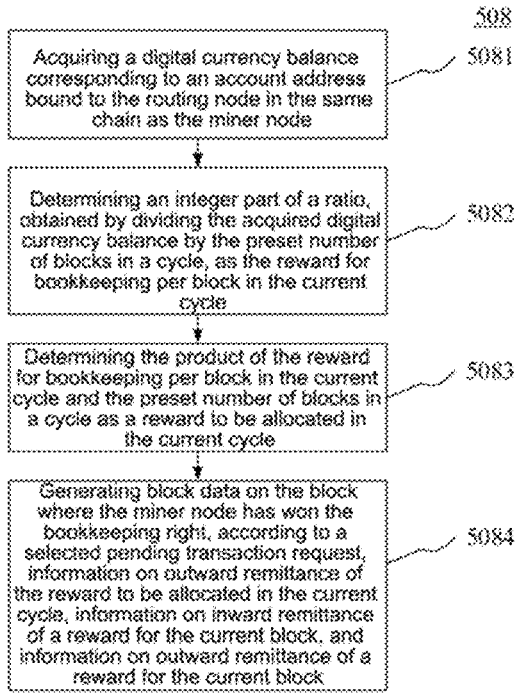
FIG. 6C is a subdivision flowchart of step 508 in the sequence diagram shown in FIG. 6B.

With continued reference to FIGS. 6A to 6C, a timing sequence 500 of an embodiment of a blockchain system according to the present disclosure is shown.

The blockchain system in this embodiment may include at least one parallel chain (e.g., parallel chains 401, 402, and 403 shown in FIG. 5). Each parallel chain may include a routing node (e.g., routing nodes 4011, 4021, and 4031 shown in FIG. 5) and at least one miner node (e.g., miner nodes 4012, 4013, 4014, 4015, 4022, 4023, 4024, 4032, 4033, 4034, 4035, and 4036 shown in FIG. 5). Each miner node of each parallel chain stores data by using a distributed data blockchain. The routing nodes of the at least one parallel chain are connected over a network.

As shown in FIG. 6A, the timing sequence 500 of an embodiment of a blockchain system according to the present disclosure may include the following steps.

In step 501, a miner node acquires a lower-limit accumulative unused duration and executes a bookkeeping right determination operation in a trusted execution environment associated with the miner node, to compete for the bookkeeping right for an intrachain transaction request in a parallel chain where the miner node is located.

In this embodiment, a miner node may compete for a bookkeeping right for an intrachain transaction request in a parallel chain where the miner node is located, by using any of the consensus methods in the embodiment shown in FIG. 2A, or using any of the consensus methods in the embodiment shown in FIG. 3, or using any of the consensus methods in the embodiment shown in FIG. 4.

In this embodiment, the transaction request may include an outward remittance request and an inward remittance request. For example, there is a transaction request D for transferring X units of a digital currency from an account address A to an account address B. Then, the transaction request D may include an outward remittance request D1 and an inward remittance request D2, where the outward remittance request D1 is a request for subtracting X units of the digital currency from the account address A, and the inward remittance request D2 is a request for adding X units of the digital currency to the account address B. In practice, addition or subtraction of X units of a digital currency to or from a certain account address may be embodied as an increase or decrease in the total amount expressed by all UTXO (Unspent Transaction Output) belonging to the account address, when being implemented in blockchain software.

Here, the intrachain transaction request in the parallel chain where the miner node is located may specifically include the following two cases. (1) If both a remitter account address and a remittee account address in the transaction request correspond to the parallel chain where the miner node is located, both an outward remittance request and an inward remittance request in the transaction request are intrachain transaction requests in the parallel chain where the miner node is located. (2) If the remitter account address in the transaction request corresponds to the parallel chain where the miner node is located, while the remittee account address in the transaction request does not correspond to the parallel chain where the miner node is located, then the outward remittance request in the transaction request is an intrachain transaction request in the parallel chain where the miner node is located, while the inward remittance request in the transaction request is not an intrachain transaction request in the parallel chain where the miner node is located, and the inward remittance request in the transaction request is an intrachain transaction request in a parallel chain corresponding to the remittee account address in the transaction request.

The use of the above example is continued. Moreover, if the account address A corresponds to a parallel chain L1 and the account address B corresponds to a parallel chain L2, the outward remittance request D1 is an intrachain transaction request in the parallel chain L1, and the inward remittance request D2 is an intrachain transaction request in the parallel chain L2.

It should be noted that a user may use a SPV node or a miner node in a parallel chain to submit a transaction request, the SPV node or the miner node may send the received transaction request to a routing node in a parallel chain corresponding to a remitter account address in the transaction request, and the routing node may sign and then broadcast the received transaction request to miner nodes in the same chain as the routing node. In this way, the miner nodes may receive the transaction request and compete for the bookkeeping right for the intrachain transaction request in the parallel chain where the miner nodes are located, by using any consensus method in the embodiment shown in FIG. 2A, or using any consensus method in the embodiment shown in FIG. 3, or using any consensus method in the embodiment shown in FIG. 4.

In practice, each account address may correspond to one parallel chain. An account address may be corresponded to one of the parallel chains included in the blockchain system in various implementable manners. For example, one parallel chain may be randomly selected from the parallel chains included in the blockchain system as a parallel chain corresponding to the account address. A parallel chain where a miner node is located may be a parallel chain corresponding to an account address bound to the miner node. A parallel chain corresponding to an account address bound to a SPV node is the parallel chain where the SPV node is located.

In step 502, a routing node synchronizes a blockchain of miner nodes in the same chain as the routing node to a local blockchain in real time.

In this embodiment, a routing node (e.g., routing node 4011, 4021, or 4031 shown in FIG. 5) will also synchronize a blockchain of miner nodes in the same chain as the routing node to a local blockchain in real time. In other words, the routing node will not perform the operations of competing for bookkeeping rights and bookkeeping operations, but a blockchain (ledger) of the parallel chain where the routing node is located is synchronously saved in the routing node.

It should be noted that the routing node may execute step 502 at any time, and step 502 is not limited to being executed after step 501 is executed.

In practice, each routing node may correspond to one parallel chain. A routing node may be corresponded to one of the parallel chains included in the blockchain system in various implementable manners. For example, the domain name of a routing node may be associated with a parallel chain identifier of a parallel chain where the routing node is located. For example, "routenode0.xxx.com" is the domain name of a routing node in a parallel chain indicated by a parallel chain identifier "0", "routenode1.xxx.com" is the domain name of a routing node in a parallel chain indicated by a parallel chain identifier "1", and "routenode65535.xxx.com" is the domain name of a routing node in a parallel chain indicated by a parallel chain identifier "65535".

Here, miner nodes in the same chain as the routing node are miner nodes belonging to the same parallel chain as the routing node. For example, as shown in FIG. 5, the miner nodes 4012, 4013, 4014, and 4015 are miner nodes in the same chain as the routing node 4011.

In some optional implementations of this embodiment, the foregoing timing sequence 500 may further include step 503 to step 505:

In step 503, in response to reception of bookkeeping right determination information and a bookkeeping right determination information signature, the routing node verifies the signature of the received bookkeeping right determination information using a preset public key, where the bookkeeping right determination information includes a hash value of a previous block, a lower-limit accumulative unused duration, and an account address.

Each parallel chain is usually based on a peer-to-peer (P2P) network. If a miner node sends bookkeeping right determination information and a bookkeeping right determination information signature to neighboring nodes in step 501 (referring to sub-step 2025 in the embodiment shown in FIG. 2B for details), the routing node may also receive the bookkeeping right determination information and the bookkeeping right determination information signature sent from the miner node in the same chain because the routing node is also a node in the parallel chain. Therefore, in the case where the routing node receives bookkeeping right determination information and a bookkeeping right determination information signature sent from a miner node in the same chain, the routing node may verify the signature of the received bookkeeping right determination information using a preset public key.

Here, a preset public key in a preset key pair stored in the trusted execution environment associated with the miner node is also stored in the routing node.

If the bookkeeping right determination information signature received by the routing node is obtained by signing with a preset private key, the signature of the received bookkeeping right determination information will be successfully verified by using the preset public key.

If the bookkeeping right determination information and the bookkeeping right determination information signature received by the routing node are not obtained by signing with a preset private key, the signature of the received bookkeeping right determination information will not be successfully verified by using the preset public key.

Here, the routing node may go to the execution of step 504 in the case where the signature is successfully verified in step 503.

In step 504, in response to the successful verification of the signature of the received bookkeeping right determination information, the routing node checks the hash value of the previous block and the lower-limit accumulative unused duration included in the received bookkeeping right determination information with a hash value of a tail block in the blockchain of the routing node and with a lower-limit accumulative unused duration stored locally in the routing node, respectively.

Here, in the case where the signature of the received bookkeeping right determination information is successfully verified with the preset public key in step 503, the routing node may check the hash value of the previous block and the lower-limit accumulative unused duration included in the received bookkeeping right determination information with a hash value of a tail block in the blockchain of the routing node and with a lower-limit accumulative unused duration stored locally in the routing node, respectively. If the checking succeeds, it is indicated that the bookkeeping right determination information is not forged by the miner node from which the received bookkeeping right determination information is sent, and then the process may go to step 505. If the checking fails, it is indicated that the bookkeeping right determination information is forged by the miner node from which the received bookkeeping right determination information is sent.

Here, the tail block in the blockchain of the routing node may be one of blocks of the routing node that have not been finalized (for example, the blocks that have not been finalized may refer to fewer than six later blocks in the blockchain of the routing node). For example, a routing node R1 has three unfinalized blocks B4, B5, and B6, and the blocks B4, B5, and B6 have hash values H4, H5, and H6, respectively. Then, in the execution of step 504, the routing node may compare the hash value of the previous block in the received bookkeeping right determination information with said hash values H4, H5, and H6, respectively. If one of the hash values H4, H5, and H6 is the same as the hash value of the previous block in the received bookkeeping right determination information, it may be determined that the hash value of the previous block in the received bookkeeping right determination information is successfully checked.

In step 505, in response to the successful checking of the hash value of the previous block and the lower-limit accumulative unused duration in the received bookkeeping right determination information, the routing node determines the account address in the received bookkeeping right determination information as an account address bound to a miner node which has won a second current block.

Here, in the case where the hash value of the previous block and the lower-limit accumulative unused duration in the received bookkeeping right determination information are successfully checked in step 504, the routing node may determine the account address in the received bookkeeping right determination information as an account address bound to a miner node which has won a second current block. The second current block is a block next to a block indicated by the hash value of the previous block in the received bookkeeping right determination information.

In some optional implementations of this embodiment, the foregoing timing sequence 500 may further include the following step 506.

In step 506, in response to the unsuccessful checking of the hash value of the previous block and the lower-limit accumulative unused duration in the received bookkeeping right determination information, the routing node adds the account address in the received bookkeeping right determination information to a blacklist account address set stored locally.

Here, a blacklist account address set is stored locally in the routing node. In practice, the routing node will check whether a transaction request is legitimate after the transaction request is received. Only a transaction request that has been checked to be legitimate will be signed by the routing node and then broadcast to each of miner nodes in the same chain as the routing node. Here, the checking of legitimacy may include, but is not limited to, verifying whether the remitter account address in the transaction request has a UTXO record, verifying whether the balance of the remitter account address in the transaction request can support this transaction request, verifying whether the remitter account address or the remittee account address in the transaction request is an account address in a blacklist account address set stored in the routing node, and the like. Therefore, here, if the hash value of the previous block and the lower-limit accumulative unused duration in the received bookkeeping right determination information are unsuccessfully checked by the routing node in step 504, it is indicated that the bookkeeping right determination information is forged by the miner node from which the received bookkeeping right determination information is sent. Then the account address in the received bookkeeping right determination information may be added to a blacklist account address set stored in the routing node. Any of outward remittance transaction requests and inward remittance transaction requests corresponding to the account addresses in the blacklist account address set will be blocked by the routing node in a legitimacy checking because it is not checked to be legitimate.

Continued reference is now made to FIG. 6B due to page display restriction. It should be noted that a process of FIG. 6B may include the various steps shown in FIG. 6A, in addition to procedures shown in FIG. 6B.

In practice, miner nodes get rewards from two resources, including: rewards for winning bookkeeping rights, commonly known as rewards for mining; and rewards for bookkeeping, namely, rewards for individual transaction requests recorded in the current blocks of the miner nodes, commonly known as bookkeeping fees (or transaction service charges or transaction commission). However, the values of the rewards for bookkeeping are related to time periods. More rewards for bookkeeping are given in time periods during which there are more transactions, and fewer rewards for bookkeeping are given in time periods during which there are fewer transactions. In order to create a more stable blockchain system without being affected by time periods, in some optional implementations of this embodiment, the foregoing timing sequence 500 may further include step 507 to step 509 shown in FIG. 6B.

In step 507, the miner node determines, according to a block where the miner node has won the bookkeeping right, whether to enter a new lower-limit accumulative unused duration adjustment cycle.

Here, the miner node may determine, according to a block where the miner node has won the bookkeeping right, whether to enter a new lower-limit accumulative unused duration adjustment cycle (i.e., a new cycle of adjustment of the lower-limit accumulative unused duration). If there are N−1 (where N represents the preset number of blocks in a cycle) blocks between a block corresponding to the previous adjustment of the lower-limit accumulative unused duration and a block where the miner node has won the bookkeeping right, the block where the miner node has won the bookkeeping right correspondingly enters a new accumulative unused duration adjustment cycle. The block where the miner node has won the bookkeeping right is the first block to enter a new accumulative unused duration adjustment cycle. Then it may be determined to enter a new lower-limit accumulative unused duration adjustment cycle, and then the execution goes to step 508. Otherwise, it may be determined not to enter a new lower-limit accumulative unused duration adjustment cycle, and then the execution goes to step 509.

In some optional implementations of this embodiment, each block may be indicated by a block identifier. Then the miner node may determine whether the block identifier of the block where the miner node has won the bookkeeping right falls within a preset set of block identifiers of new cycle. If yes, it may be determined to enter a new lower-limit accumulative unused duration adjustment cycle. Here, the preset set of block identifiers of new cycle may be a set of block identifiers predetermined by a technician based on experience, each indicating the first block to enter a new lower-limit accumulative unused duration adjustment cycle. For example, assuming that the preset number of blocks in a cycle is 1,008, the lower-limit accumulative unused duration is adjusted for every 1,008 blocks generated. Then, assuming that block identifiers are increased from 0, the set of block identifiers of new cycle may include: 0, 1008, . . . , 1008×n, where n is a positive integer.

In step 508, in response to the determination to enter a new lower-limit accumulative unused duration adjustment cycle, the miner node executes an operation of determining a reward for bookkeeping per block in the current cycle.

Here, the miner node may determine in step 507 to enter a new lower-limit accumulative unused duration adjustment cycle, and execute an operation of determining a reward for bookkeeping per block in the current cycle, where the operation of determining a reward for bookkeeping per block in the current cycle may include sub-step S081 to sub-step S084 as shown in FIG. 6C.

In sub-step S081, a digital currency balance corresponding to an account address bound to the routing node in the same chain as the miner node is acquired.

Here, a new lower-limit accumulative unused duration adjustment cycle is entered, and rewards for bookkeeping for transaction requests in the individual blocks generated in the previous lower-limit accumulative unused duration adjustment cycle have been transferred to an account address bound to the routing node in the same chain as the miner node. Therefore, the miner node may acquire a digital currency balance corresponding to the account address bound to the routing node in the same chain as the miner node. The acquired digital currency balance may be used for being evenly allocated to miner nodes corresponding to individual blocks generated in the current lower-limit accumulative unused duration adjustment cycle.

In sub-step S082, an integer part of a ratio obtained by dividing the acquired digital currency balance by the preset number of blocks in a cycle is determined as the reward for bookkeeping per block in the current cycle.

Here, if a ratio obtained by dividing the acquired digital currency balance by the preset number of blocks in a cycle is used directly as the reward for bookkeeping per block in the current cycle, the reward for bookkeeping per block in the current cycle may be an integer or a floating-point number. If the reward for bookkeeping per block in the current cycle is a floating-point number, each miner node has different accuracy in the division operation here because different miner nodes might have different hardware structures. In order to avoid differences in the calculation of the reward for bookkeeping per block in the current cycle that might be caused due to the differences in the hardware structures of the individual miner nodes, an integer part of the ratio obtained by dividing the acquired digital currency balance by the preset number of blocks in a cycle may be determined here as the reward for bookkeeping per block in the current cycle. In this way, it can be ensured that the same reward for bookkeeping per block in the current cycle is calculated even if each miner node has different hardware.

Here, the reward for bookkeeping per block in the current cycle is used for representing that the same bookkeeping reward (i.e., the reward for bookkeeping per block in the current cycle) is given for bookkeeping in each block newly generated in the current lower-limit accumulative unused duration adjustment cycle, to a miner node that has won the bookkeeping right in the block. Here, the reward for bookkeeping in each block newly generated in the current lower-limit accumulative unused duration adjustment cycle is related only to the total amount of the rewards for bookkeeping for the transaction requests in the blocks in the previous lower-limit accumulative unused duration adjustment cycle, and is independent of a reward for bookkeeping for a transaction request to be recorded in the block. In this way, miner nodes will get the same rewards for bookkeeping, no matter whether they compete for bookkeeping rights in time periods during which there are more transactions or in time periods during which there are fewer transactions. As a result, there is no occurrence of a great reduction in the number of miner nodes competing for bookkeeping rights in a time period during which there are fewer transactions.

Here, the preset number of blocks in a cycle is the preset number of blocks generated in each lower-limit accumulative unused duration adjustment cycle. For example, the preset number of blocks in a cycle may be 1,008.

In sub-step S083, the product of the reward for bookkeeping per block in the current cycle and the preset number of blocks in a cycle is determined as a reward to be allocated in the current cycle.

For a more intuitive description, the sub-step S082 and sub-step S083 may be expressed by using the following formulas:

$$U_a = [U \div N] \quad (3)$$

$$U' = U_a \times N \quad (4)$$

where
- U is the acquired balance;
- N is the preset number of blocks in a cycle;
- [ ] is a round-down symbol;
- $U_a$ is the calculated reward for bookkeeping per block in the current cycle;
- U' is the calculated reward to be allocated in the current cycle.

Here, the reward to be allocated in the current cycle is used for representing a total bookkeeping reward shared by miner nodes corresponding to the individual blocks newly generated in the current lower-limit accumulative unused duration adjustment cycle.

In sub-step S084, block data on the block where the miner node has won the bookkeeping right is generated according to a selected pending transaction request, information on outward remittance of the reward to be allocated in the current cycle, information on inward remittance of a reward for the current block, and information on outward remittance of a reward for the current block.

Here, a set of pending transaction requests is stored locally in the miner node. Since the miner node has won the bookkeeping right, the miner node will now select a pending transaction request from the set of pending transaction requests stored locally and write the selected pending transaction request into a block that currently has won the bookkeeping right. In addition to writing the selected pending transaction request into the block that currently has won the bookkeeping right, information on outward remittance of the reward to be allocated in the current cycle, information on inward remittance of a reward for the current block, and information on outward remittance of a reward for the current block will be also written into this block, because the block that currently has won the bookkeeping right is the first block in the current lower-limit accumulative unused duration adjustment cycle. Here, the information on outward remittance of the reward to be allocated in the current cycle is used for representing transfer of the reward to be allocated in the current cycle from the account address bound to the routing node in the same chain as the miner node. The information on inward remittance of a reward for the current block is used for representing transfer of the reward for bookkeeping per block in the current cycle into an account address bound to the miner node. The information on outward remittance of a reward for the current block is used for representing transfer of a bookkeeping reward corresponding to the selected pending transaction request into the account address bound to the routing node in the same chain as the miner node. In other words, the transfer of the reward to be allocated in the current cycle from the account address bound to the routing node in the same chain as the miner node, the transfer of the reward for bookkeeping per block in the current cycle into the account address bound to the miner node, and the transfer of a bookkeeping reward corresponding to the selected pending transaction request into the account address bound to the routing node in the same chain as the miner node are recorded in the first block in the current lower-limit accumulative unused duration adjustment cycle.

In step 509, in response to the determination not to enter a new lower-limit accumulative unused duration adjustment cycle, the miner node generates block data on the block where the miner node has won the bookkeeping right, according to a selected pending transaction request, information on inward remittance of a reward for the current block, and information on outward remittance of a reward for the current block.

Here, it may be determined by the miner node in step 507 not to enter a new lower-limit accumulative unused duration adjustment cycle, indicating that the block where the miner node has currently won the bookkeeping right is not the first block in the current accumulative unused duration adjustment cycle. Similarly, since the miner node has won the bookkeeping right, the miner node will now select a pending transaction request from the set of pending transaction requests stored locally, and write the selected pending transaction request into the block that currently has won the bookkeeping right. While the selected pending transaction request is written into the block that currently has won the bookkeeping right, it is unnecessary to transfer the reward to be allocated in the current cycle from the account address bound to the routing node in the same chain as the miner node because the block that currently has won the bookkeeping right is not the first block in the current lower-limit accumulative unused duration adjustment cycle. However, each miner node that has won a bookkeeping right will get a reward for bookkeeping per block in the current cycle. Moreover, each of the selected pending transaction requests corresponds to a bookkeeping reward, and it is necessary to transfer the bookkeeping reward corresponding to the selected pending transaction request into the account address bound to the routing node in the same chain as the miner node. Therefore, information on inward remittance of a reward for the current block and information on outward remittance of a reward for the current block will also be written into this block. Similarly to the above, here, the information on inward remittance of a reward for the current block is used for representing transfer of the reward for bookkeeping per block in the current cycle into the account address bound to the miner node. The information on outward remittance of a reward for the current block is used for representing transfer of a bookkeeping reward corresponding to the selected pending transaction request into the account address bound to the routing node in the same chain as the miner node.

The PoW consensus algorithm should be based on complete block data, including pending transactions that have already been packaged, so that a hash value of the root of a Merkle Tree recorded in the block header can be determined.

Therefore, if a PoET consensus mechanism to which a PoW consensus mechanism is superimposed is selected and used as the consensus mechanism in said blockchain system, the step 507, step 508, and step 509 should be executed before step 501. In other words, it is necessary to determine whether or not to enter a new lower-limit accumulative unused duration adjustment cycle before executing a bookkeeping right determination operation, and an operation of determining a reward for bookkeeping per block in the current cycle is executed in the case where it is determined to enter a new lower-limit accumulative unused duration adjustment cycle, and block data on a block where a miner node has won a bookkeeping right is generated according to a selected pending transaction request, information on inward remittance of a reward for the current block, and information on outward remittance of a reward for the current block in the case where it is determined not to enter a new lower-limit accumulative unused duration adjustment cycle.

Conversely, if only a PoET consensus mechanism is used in said blockchain system, the step 507, step 508, and step 509 may be executed after step 501.

In some optional implementations of this embodiment, the foregoing timing sequence 500 may further include the following step 510 and step 511.

In step 510, the routing node determines a time interval at which two bookkeeping rights are successively won by a same miner node in the same chain as the routing node.

Here, a blockchain of miner nodes in the same chain as the routing node is synchronized in the routing node, the routing node may determine, from the local blockchain, a time interval at which two bookkeeping rights are successively won by a same miner node in the same chain as the routing node.

In step 511, in response to the fact that a duration difference obtained by subtracting the determined time interval from the lower-limit accumulative unused duration is greater than a preset duration threshold, the routing node adds an account address bound to the miner node corresponding to the determined time interval to the blacklist account address set.

Here, the routing node has determined, in step 510, a time interval at which two bookkeeping rights are successively won by a same miner node in the same chain as the routing node. Thus, in step 511, the routing node may first calculate a duration difference obtained by subtracting the determined time interval from the lower-limit accumulative unused duration, and then determine whether the calculated duration difference is greater than a preset duration threshold. If the duration difference is greater than the preset duration threshold, it is indicated that the time interval determined in step 510 is shorter. Namely, the miner node corresponding to the time interval determined in step 510 has successively won two bookkeeping rights at a shorter time interval. In other words, the miner node corresponding to the time interval determined in step 510 might have cheated. Then the routing node may add an account address bound to the miner node corresponding to the determined time interval to the blacklist account address set. Hence, any of outward remittance transaction requests and inward remittance transaction requests relating to the account address bound to the miner node corresponding to the determined time interval will be blocked by the routing node in a legitimacy checking because it is not checked to be legitimate.

The step 510 and step 511 include at least the following technical effects.

Firstly, it can be proved that device vendors of trusted execution environments will not cheat.

Secondly, serious security problems can be prevented in case that the consensus algorithm of the blockchain system is cracked. The cracking may include: shortening a time interval for waiting for a bookkeeping right by destroying a hardware clock in a trusted execution environment, or cracking a first key pair stored in the trusted execution environment, or the like.

For the implementation of a blockchain system using parallel chains (e.g., FIG. 4), an embodiment of the present disclosure further provides a method of restricting a miner node to mine only in a designated parallel chain by means of its associated trusted execution environment. Firstly, individual parallel chains in a blockchain system are numbered, for example, numbered 0, 1, 2, . . . , N, etc., where N is the total number of the parallel chains in the system. Then, an identification number K of a miner is extracted by a public key of the miner recorded in a trusted execution environment. For instance, K is obtained by calculating an integer value from the last four bytes of the public key (or a hash value of the public key) of the miner, and then a chain number is calculated by obtaining a remainder from K by K%N. In other words, the miner is restricted to mine only in a parallel chain corresponding to the calculated chain number. It will be understood that the chain number of a miner may be calculated by other methods, for example, calculated according to an account address of the miner recorded in a trusted execution environment. This calculation method is essentially similar to the above calculation method, because, in practice, the account address of a miner may also be obtained from its public key or a hash value of the public key. Here, each trusted execution environment may be understood as a miner.

In order to implement the foregoing method of restricting a miner to mine in a designated parallel chain, in some optional solutions, a public key (or a hash value of the public key), referred to as public key information, of a miner that has gained a bookkeeping right should be recorded in a block in a blockchain system. A miner node, which has received a block ready for bookkeeping that is broadcast by a miner node in the same parallel chain, may calculate a number of a parallel chain, where the bookkeeping miner for the block is located, according to the public key information recorded in the block (for example, by using the above formula K%N). If the calculated result is consistent with the number of the parallel chain where it is located, the received block ready for bookkeeping is approved. Otherwise, the block ready for bookkeeping may be discarded. Of course, the miner node may also perform other verifications for the approved block, for example, verifying whether the bookkeeping right is legitimate, verifying the cool-down time, and the like, before deciding whether to finally incorporate the block into the local blockchain. In addition, unforgeable accounts of miners must be guaranteed by trusted execution environments in order to support the forgoing method of restricting a miner to mine in a designated parallel chain. The specific implementation steps include: presetting a unique device number in trusted execution environment and presetting a program in the trusted execution environment before issuing the trusted execution environment (i.e., issuing particular CPU chips, dongles, and other devices mentioned above) by an operator of a blockchain system. This program only allows the holder of a trusted execution environment to register a miner account once, and the account is not allowed to be deleted or modified once registered. This measure is equivalent to forcibly binding account addresses of miners to the hardware device numbers. In other words, when a number of trusted execution environments are issued, at most a corresponding number of miner accounts can be created. Thus, creation of a large number of accounts based on the same device can be avoided. A specific description is given below by way of example.

In an optional solution, a trusted execution environment to which a miner account has been registered must first initiate a request to an access server of the operator during online mining, and then the access server will designate a parallel chain to which the trusted execution environment belongs (i.e., a parallel chain where the trusted execution environment is allowed to mine). The chain number of the parallel chain may be calculated in accordance with the method given above (e.g., K%N). Further, some operators' access servers also identify whether the miner participates in online mining for the first time by using a lookup table based on a unique device number corresponding to the trusted execution environment. If yes, the operator's access server will also associate the unique device number corresponding to the trusted execution environment with the miner account registered to the device. The association relationship is recorded in a database.

During the daily operation of the blockchain system, said operator's access server may also monitor whether only one device is working over the entire network at the same time for a trusted execution environment with a unique device number. If someone forges a trusted execution environment connected to the network with a new device number, the operator's access server can identify whether the device number is forged, because all the trusted execution environments are issued by the operator, and a unique device number corresponding to each trusted execution environment is preset and cannot be modified. If someone uses a legitimate device number to forge one or more trusted execution environments, the access server can also automatically identify, based on the characteristic of continuous handshake communication between an online trusted execution environment and the access server, whether there is a case where multiple devices share the same number, for example, whether the communication frequency is abnormal, or whether the same device number is associated with a unique miner account. When the access server identifies that a trusted execution environment has been forged, the access server will permanently block the trusted execution environment from accessing the network for mining, and may further notify all miner nodes over the entire network to incorporate a miner account associated with the forged trusted execution environment into a blacklist account address set.

It will be understood that the foregoing method of restricting a miner to mine in a designated parallel chain is characterized by a certain degree of centralized control, which is essentially intended to give an operator the network right for a blockchain, thereby effectively preventing an attacker from launching an attack by aggregating the computing power in a certain local part (such as a certain parallel chain). Other rights (such as right to compete for bookkeeping) of miners are still decentralized. Therefore, the security of the blockchain system is improved to a certain extent.

Figure 7:
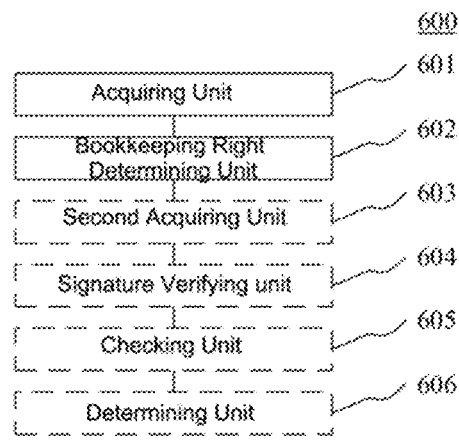
FIG. 7 is a schematic structural diagram of an embodiment of a consensus apparatus for use in a miner node in a blockchain system according to the present disclosure.

With further reference to FIG. 7, as an implementation of the methods shown in the above figures, the present disclosure provides an embodiment of a consensus apparatus for use in a miner node in a blockchain system. The embodiment of the apparatus is corresponding to the embodiment of the method shown in FIG. 2A. The apparatus may be specifically used in various electronic devices.

As shown in FIG. 7, an embodiment of a consensus apparatus 600 for use in a miner node in a blockchain system according to the present disclosure includes an acquiring unit 601 and a bookkeeping right determining unit 602. Here, the acquiring unit 601 is configured to acquire a lower-limit accumulative unused duration. The bookkeeping right determining unit 602 is configured to execute, in a trusted execution environment associated with the miner node, a bookkeeping right determination operation including: determining a current accumulative unused duration for the miner node; determining whether the current accumulative unused duration is more than the lower-limit accumulative unused duration; and, in response to the determination that the current accumulative unused duration is more than the lower-limit accumulative unused duration, determining that the miner node has won a bookkeeping right, and updating the current accumulative unused duration with a difference between the current accumulative unused duration and the lower-limit accumulative unused duration.

In this embodiment, specific processes performed and technical effects achieved by the acquiring unit 601 and the bookkeeping right determining unit 602 of the consensus apparatus 600 for use in a miner node in a blockchain system can be understood with reference to the related descriptions of step 201 and step 202 in the corresponding embodiment of FIG. 2A, respectively, and therefore will not be described in detail here.

In some optional implementations of this embodiment, making the miner node associated with a trusted execution environment may include: providing the trusted execution environment associated with the miner node in the miner node; or providing the trusted execution environment associated with the miner node in another electronic device connected to the miner node over a network, wherein the miner node interacts with its associated trusted execution environment through a message communication mechanism.

In some optional implementations of this embodiment, the bookkeeping right determination operation may further include: determining, in response to the determination that the miner node has won the bookkeeping right, whether to adjust the lower-limit accumulative unused duration according to a block where the miner node has won the bookkeeping right; and adjusting, in response to the determination to adjust the lower-limit accumulative unused duration, the lower-limit accumulative unused duration by performing the operations of: determining an adjusted lower-limit accumulative unused duration according to the lower-limit accumulative unused duration, a real adjustment cycle duration, and an expected adjustment cycle duration, wherein the real adjustment cycle duration is a duration between a timing of generation of the block where the miner node has won the bookkeeping right and a timing of generation of a block corresponding to the previous adjustment of the lower-limit accumulative unused duration in the blockchain of the miner node; and updating the lower-limit accumulative unused duration to the adjusted lower-limit accumulative unused duration.

In some optional implementations of this embodiment, the adjusted lower-limit accumulative unused duration may be positively correlated with the lower-limit accumulative unused duration and the expected adjustment cycle duration, and the adjusted lower-limit accumulative unused duration may be negatively correlated with the real adjustment cycle duration.

In some optional implementations of this embodiment, the determination of an adjusted lower-limit accumulative unused duration according to the lower-limit accumulative unused duration, a real adjustment cycle duration, and an expected adjustment cycle duration includes: calculating an adjusted lower-limit accumulative unused duration according to the lower-limit accumulative unused duration, the real adjustment cycle duration, and the expected adjustment cycle duration in accordance with the following formula:

$$T'_{min} = \frac{T_{min} T_{exp}}{T_{real}}$$

where $T_{min}$ is the lower-limit accumulative unused duration, $T_{exp}$ is the expected adjustment cycle duration, $T_{real}$ is the real adjustment cycle duration, and $T_{min}'$ is the calculated adjusted lower-limit accumulative unused duration.

In some optional implementations of this embodiment, the determination of an adjusted lower-limit accumulative unused duration according to the lower-limit accumulative unused duration, a real adjustment cycle duration, and an expected adjustment cycle duration includes: calculating an adjusted lower-limit accumulative unused duration according to the lower-limit accumulative unused duration, the real adjustment cycle duration, and the expected adjustment cycle duration in accordance with the following formula:

$$T'_{min} = \frac{\alpha T_{min} T_{exp} + \beta}{\gamma T_{real} + \theta}$$

where $T_{min}$ is the lower-limit accumulative unused duration, $T_{exp}$ is the expected adjustment cycle duration, $T_{real}$ is the real adjustment cycle duration, $T_{min}'$ is the calculated adjusted lower-limit accumulative unused duration, and $\alpha$, $\beta$, $\gamma$, and $\theta$ are preset constants.

In some optional implementations of this embodiment, before executing a bookkeeping right determination operation in the trusted execution environment associated with the miner node, the apparatus may further include a second acquiring unit 603 configured to acquire a hash value of a block previous to the block ready for bookkeeping; and after it is determined that the miner node has won the bookkeeping right, the bookkeeping right determination operation may further include: signing bookkeeping right determination information with a preset private key stored in the trusted execution environment to obtain a bookkeeping right determination information signature in the trusted execution environment associated with the miner node, wherein the bookkeeping right determination information includes: the hash value of the block previous to the block ready for bookkeeping, the lower-limit accumulative unused duration, and an account address bound to the miner node, wherein the account address bound to the miner node is stored in the trusted execution environment associated with the miner node; and broadcasting the bookkeeping right determination information and the bookkeeping right determination information signature to nodes neighboring the miner node.

In some optional implementations of this embodiment, the preset private key is a private key preset when the trusted execution environment is issued, or a private key corresponding to the account address bound to the miner node.

In some optional implementations of this embodiment, the bookkeeping right determination information may further include a real-name authentication identifier stored in the trusted execution environment associated with the miner node, and the real-name authentication identifier is used for representing whether the trusted execution environment associated with the miner node has passed a real-name authentication from a third-party organization.

In some optional implementations of this embodiment, the trusted execution environment associated with the miner node may interact with the outside world in a ciphertext manner; and the bookkeeping right determining unit 602 may be further configured to: encrypt an instruction corresponding to the bookkeeping right determination operation with a preset administrator public key, to obtain an encrypted instruction; decrypt the obtained encrypted instruction with a preset administrator private key stored in the trusted execution environment associated with the miner node, to obtain a decrypted instruction, and execute the decrypted instruction to execute the bookkeeping right determination operation in the trusted execution environment associated with the miner node; and encrypt a result of the execution of the bookkeeping right determination operation with a preset key stored in the trusted execution environment associated with the miner node, and then output the encrypted execution result from the trusted execution environment associated with the miner node.

In some optional implementations of this embodiment, the apparatus 600 may further include: a signature verifying unit 604 configured to verify, in response to reception of bookkeeping right determination information and a bookkeeping right determination information signature, the signature of the received bookkeeping right determination information with a preset public key; a checking unit 605 configured to check a hash value of a previous block and a lower-limit accumulative unused duration in the received bookkeeping right determination information with a hash value of a tail block in the blockchain of the miner node and with the lower-limit accumulative unused duration, respectively, in response to the successful verification of the signature of the received bookkeeping right determination information; and a determining unit 606 configured to determine, in response to the successful checking, an account address in the received bookkeeping right determination information as an account address bound to a miner node which has won a first current block, wherein the first current block is a block next to a block indicated by the hash value of the previous block in the received bookkeeping right determination information.

In some optional implementations of this embodiment, after determining the current accumulative unused duration for the miner node, the bookkeeping right determination operation may further include: in response to a determination that the current accumulative unused duration for the miner node is more than an upper-limit accumulative unused duration, updating the current accumulative unused duration to the upper-limit accumulative unused duration.

In some optional implementations of this embodiment, the bookkeeping right determination operation may further include: before executing the bookkeeping right determination operation in the trusted execution environment associated with the miner node, judging whether a time interval from the time at which the previous bookkeeping is performed in the trusted execution environment is more than a cool-down duration, wherein the cool-down duration is k times the lower-limit accumulative unused duration, where k is a constant greater than 0 and less than 1; and executing the bookkeeping right determination operation in the trusted execution environment, if yes.

In some optional implementations of this embodiment, the bookkeeping right determination operation may further include: after judging whether a time interval from the time at which the previous bookkeeping is performed in the trusted execution environment is more than a cool-down duration, if the time interval from the time at which the previous bookkeeping is performed in the trusted execution environment is not more than the cool-down duration, calculating a time interval to a next competition for a bookkeeping right in which the trusted execution environment can participate, wherein the time interval is a difference between the cool-down duration and the time interval from the time at which the previous bookkeeping is performed in the trusted execution environment.

In some optional implementations of this embodiment, the time interval t1 from the time at which the previous bookkeeping is performed in the trusted execution environment is calculated by the following formula:

$$t1 = (Height2 - Height1) \cdot \bar{t}$$

where Height2 is the height of a block in the blockchain where the trusted execution environment has won a bookkeeping right, Height1 is the height of a block in the blockchain that is generated by the previous bookkeeping in the trusted execution environment, and $\bar{t}$ is a preset constant for the blockchain system for representing an average time required for generation of a block in the blockchain system.

In some optional implementations of this embodiment, the apparatus 600 further includes: a cool-down duration checking unit configured to perform the operations of: receiving a block ready for bookkeeping that is broadcast by a miner node in the same chain; and calculating a time interval from the time at which the block ready for bookkeeping is generated to the time at which the previous bookkeeping is performed in a trusted execution environment that has won the bookkeeping right for this block, and approving the block ready for bookkeeping if the calculated time interval is more than a cool-down duration, wherein the cool-down duration t2 is k times the lower-limit accumulative unused duration, where k is a constant greater than 0 and less than 1.

In some optional implementations of this embodiment, the blockchain system includes at least one parallel chain. The parallel chain includes a routing node and at least one miner node. The routing nodes of the at least one parallel chain are connected over a network. The apparatus 600 further includes a mining orientating unit configured to perform the operations of: receiving a block ready for bookkeeping that is broadcast by a miner node in the same parallel chain; extracting, from the block ready for bookkeeping, public key information corresponding to a trusted execution environment that has won the bookkeeping right for this block, and calculating, according to the public key information, a chain number of a parallel chain where mining is performed by the trusted execution environment; and approving the block ready for bookkeeping if the calculated chain number of the parallel chain is a chain number of a parallel chain where the miner node itself is located.

In some optional implementations of this embodiment, the mining orientating unit is further configured to calculate the chain number of the parallel chain where mining is performed by the trusted execution environment according to the public key information in accordance with the following formula:

$$Num = K \% N$$

where K is a miner identification number calculated according to the public key information, N is the total number of the parallel chains in the blockchain system, and % denotes a remainder operation.

In some optional implementations of this embodiment, the trusted execution environment has its own unique device number preset therein, and the trusted execution environment provides only an interface for one-time registration of a miner account and does not provide an interface for modifying or deleting a registered miner account.

It should be noted that the detailed implementation and technical effects of the respective units of the consensus apparatus for use in a miner node in a blockchain system according to this embodiment can be understood with reference to the description of other embodiments in the present disclosure, and therefore will not be described in detail here.

Figure 8:
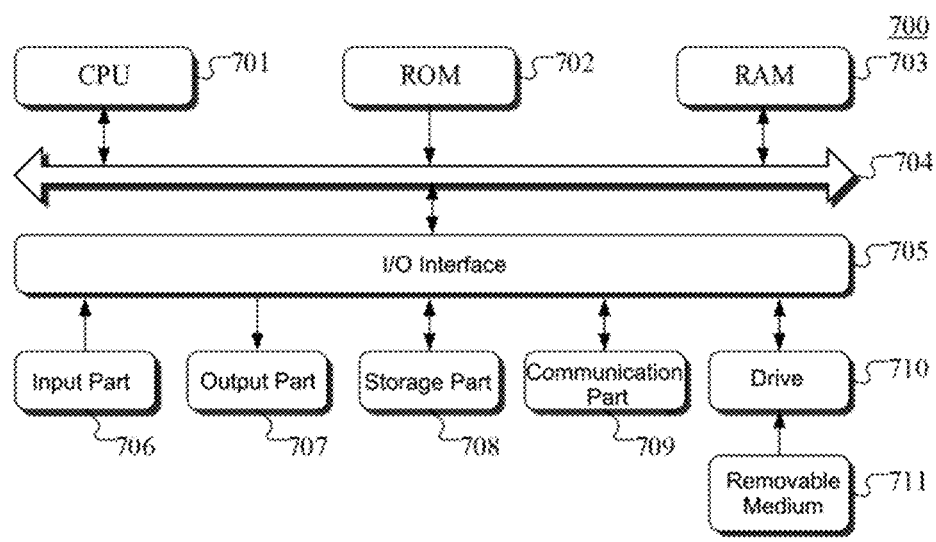
FIG. 8 is a schematic structural diagram of a computer system adapted to implement a miner node of the present disclosure.

Referring now to FIG. 8, a schematic structural diagram of a computer system 700 adapted to implement a miner node in an embodiment of the present disclosure is shown. The miner node shown in FIG. 8 is only an example and is not intended to limit, in any way, the functions and scope of use of this embodiment.

As shown in FIG. 8, the computer system 700 includes a central processing unit (CPU) 701, which may execute various appropriate actions and processes according to a program stored in a read only memory (ROM) 702 or a program loaded from a storage part 708 to a random access memory (RAM) 703. Various programs and data required for the operation of the system 700 are also stored in the RAM 703. The CPU 701, the ROM 702, and the RAM 703 are connected to one another via a bus 704. An input/output (I/O) interface 705 is also connected to the bus 704.

The following components are connected to the I/O interface 705: an input part 706 including a keyboard, a mouse, and the like; an output part 707 including a cathode ray tube (CRT), a liquid crystal display (LCD) or the like, and a speaker or the like; a storage part 708 including a hard disk or the like; and a communication part 709 including a network interface card such as a local area network (LAN) card, a modem, or the like. The communication part 709 performs communication processing via a network such as the Internet. A drive 710 is also connected to the I/O interface 705 as required. A removable medium 711, such as a magnetic disk, an optical disk, a magneto-optical disk, a semiconductor memory, or the like, is installed on the drive 710 as required, so that a computer program read therefrom is installed into the storage part 708 as required.

In particular, according to embodiments of the present disclosure, the processes described above with reference to the flowcharts may be implemented as computer software programs. For example, an embodiment of the present disclosure includes a computer program product which includes a computer program carried on a computer-readable medium, wherein the computer program contains program codes for executing a method shown in a flowchart. In such an embodiment, the computer program may be downloaded and installed from the network through the communication part 709, and/or installed from the removable medium 711. When the computer program is executed by the central processing unit (CPU) 701, the above-mentioned functions defined in the method of the present disclosure are executed. It should be noted that the computer-readable medium described in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. A more specific example of the computer-readable storage medium may include, but not limited to: an electrical connection with one or more wires, a portable computer disk, a hard disk, a random access memory (RAM), a read only memory (ROM), an erasable programmable read only memory (EPROM or flash memory), an optical fiber, a portable compact disk-read only memory (CD-ROM), an optical storage device, a magnetic storage device, or any suitable combination thereof. In the present disclosure, the computer-readable storage medium may be any tangible medium that contains or stores a program, wherein the program may be used by or in combination with an instruction execution system, apparatus, or device. In the present disclosure, the computer-readable signal medium may include a data signal propagated in a baseband or as a part of a carrier wave, in which a computer-readable program code is carried. This propagated data signal may be in many forms, including, but not limited to, an electromagnetic signal, an optical signal, or any suitable combination thereof. The computer-readable signal medium may also be any computer-readable medium, other than a computer-readable storage medium, that may send, propagate, or transmit a program for use by or in combination with an instruction execution system, apparatus, or device. The program code contained in the computer-readable medium may be transmitted by any suitable medium, including but not limited to: a wireless medium, a wire, an optical cable, RF or the like, or any suitable combination thereof.

The computer program code for executing the operations of the present disclosure may be written in one or more programming languages or a combination thereof. The programming languages include object-oriented programming languages such as Java, Smalltalk, C++, and Python, and also include conventional procedural programming languages such as "C" language or similar programming languages. The program code may be executed entirely on a user's computer, or executed partly on a user's computer, or executed as an independent software package, or executed partly on a user's computer and partly on a remote computer, or executed entirely on a remote computer or server. In the case involving a remote computer, the remote computer may be connected to the user's computer through any kind of network including a local area network (LAN) or a wide area network (WAN), or may be connected to an external computer (for example, through the Internet provided by an Internet service provider).

The flow charts and block diagrams in the figures illustrate implementable system architectures, functionalities, and operations of systems, methods and computer program products according to various embodiments of the present disclosure. In this regard, each block in the flow charts or block diagrams may represent a module, a program segment, or a portion of code, wherein the module, the program segment, or the portion of code includes one or more executable instructions for implementing specified logical function(s). It should also be noted that in some alternative implementations, the functions shown in the blocks may occur out of the order noted in the figures. For example, two blocks shown in succession may in fact be executed substantially concurrently, or they may sometimes be executed in a reverse order, depending upon the functionality involved. It will also be noted that each block of the block diagrams and/or flow charts, and combinations of blocks in the block diagrams and/or flow charts, may be implemented by special-purpose hardware-based systems that execute the specified functions or operations, or by a combination of special-purpose hardware and computer instructions.

The units involved in the description of this embodiment may be implemented by means of software or hardware. The described units may also be provided in a processor, which may, for example, be described as: a processor including an acquiring unit and a bookkeeping right determining unit. Here, the names of these units do not limit the units themselves under certain circumstances. For example, the acquiring unit may also be described as "a unit for acquiring a lower-limit accumulative unused duration".

As another aspect, the present disclosure also provides a computer-readable medium. The computer-readable medium may be contained in the apparatus described in the foregoing embodiment, or may exist alone without being assembled into the apparatus. Said computer-readable medium carries one or more programs. When said one or more programs are executed by the apparatus, the apparatus is caused to: acquire a lower-limit accumulative unused duration; execute, in a trusted execution environment associated with said miner node, a bookkeeping right determination operation including: determining a current accumulative unused duration for said miner node; determining whether said current accumulative unused duration is more than said lower-limit accumulative unused duration; and, in response to the determination that said current accumulative unused duration is more than said lower-limit accumulative unused duration, determining that said miner node has won the bookkeeping right, and updating said current accumulative unused duration with a difference between said current accumulative unused duration and said lower-limit accumulative unused duration.

The above description is merely illustrative of preferred embodiments of the present disclosure and illustrative of the utilized technical principles. It should be understood by those skilled in the art that the scope of the invention involved in the present disclosure is not limited to the technical solutions formed by specific combinations of the foregoing technical features, and should also encompass other technical solutions formed by any combinations of the foregoing technical features or their equivalent features without departing from the inventive concept described above, e.g., technical solutions formed by replacing the foregoing features with the technical features having similar functions disclosed in (but not limited to) the present disclosure or vice versa.

INDUSTRIAL APPLICABILITY

In a blockchain system and a consensus method for use in a miner node in a blockchain system according to embodiments of the present disclosure, in the case where it is determined in a trusted execution environment associated with a miner node that a current accumulative unused duration for the miner node is more than a lower-limit accumulative unused duration, it is determined that the miner node has won a bookkeeping right. Otherwise, the miner node fails in competition for the bookkeeping right and may continue to participate in the next competition for a bookkeeping right. In this way, waste of computing resources can be effectively avoided, and less electric power will be consumed in a public blockchain.

What is claimed:

1. A consensus method, applicable to a miner node in a blockchain system, wherein the consensus method is block based and replaces a PoW consensus with a non-energy-consuming PoET consensus algorithm and the miner node is associated with a trusted execution environment, and the method comprises:
   acquiring a lower-limit accumulative unused duration;
   executing, in the trusted execution environment associated with the miner node, a bookkeeping right determination operation, comprising: determining a current accumulative unused duration for the miner node; determining whether the current accumulative unused duration is more than the lower-limit accumulative unused duration; determining, in response to a determination that the current accumulative unused duration is more than the lower-limit accumulative unused duration, that the miner node has won a bookkeeping right; and updating the current accumulative unused duration by using a difference between the current accumulative unused duration and the lower-limit accumulative unused duration;
   wherein making the miner node associated with the trusted execution environment comprising:
   providing the trusted execution environment associated with the miner node in the miner node; or
   providing the trusted execution environment associated with the miner node in other electronic devices connected to the miner node over a network, wherein the miner node interacts with its associated trusted execution environment through a message communication mechanism;

wherein the bookkeeping right determination operation further comprises:

determining, in response to a determination that the miner node has won the bookkeeping right, whether to adjust the lower-limit accumulative unused duration according to a block where the miner node has won the bookkeeping right;

adjusting, in response to a determination to adjust the lower-limit accumulative unused duration, the lower-limit accumulative unused duration by performing operations of: determining an adjusted lower-limit accumulative unused duration according to the lower-limit accumulative unused duration, a real adjustment cycle duration, and an expected adjustment cycle duration, wherein the real adjustment cycle duration is a duration between a timing of generation of the block where the miner node has won the bookkeeping right and a timing of generation of a block corresponding to a previous adjustment of the lower-limit accumulative unused duration in a blockchain of the miner node; and updating the lower-limit accumulative unused duration to the adjusted lower-limit accumulative unused duration.

2. The method according to claim 1, wherein the adjusted lower-limit accumulative unused duration is positively correlated with the lower-limit accumulative unused duration and the expected adjustment cycle duration, and the adjusted lower-limit accumulative unused duration is negatively correlated with the real adjustment cycle duration.

3. The method according to claim 1, wherein the determining an adjusted lower-limit accumulative unused duration according to the lower-limit accumulative unused duration, a real adjustment cycle duration, and an expected adjustment cycle duration comprises:

calculating the adjusted lower-limit accumulative unused duration according to the lower-limit accumulative unused duration, the real adjustment cycle duration, and the expected adjustment cycle duration in accordance with a following formula:

$$T'_{min} = \frac{T_{min} T_{exp}}{T_{real}}$$

where $T_{min}$ is the lower-limit accumulative unused duration, $T_{exp}$ is the expected adjustment cycle duration, $T_{real}$ is the real adjustment cycle duration, and $T_{min}'$ is a calculated adjusted lower-limit accumulative unused duration.

4. The method according to claim 1, wherein the determining an adjusted lower-limit accumulative unused duration according to the lower-limit accumulative unused duration, a real adjustment cycle duration, and an expected adjustment cycle duration comprises:

calculating the adjusted lower-limit accumulative unused duration according to the lower-limit accumulative unused duration, the real adjustment cycle duration, and the expected adjustment cycle duration in accordance with a following formula:

$$T'_{min} = \frac{\alpha T_{min} T_{exp} + \beta}{\gamma T_{real} + \theta}$$

where
$T_{min}$ is the lower-limit accumulative unused duration, $T_{exp}$ is the expected adjustment cycle duration, $T_{real}$ is the real adjustment cycle duration, $T_{min}'$ is a calculated adjusted lower-limit accumulative unused duration, and $\alpha$, $\beta$, $\gamma$, and $\theta$ are preset constants.

5. The method according to claim 2, wherein before executing the bookkeeping right determination operation in the trusted execution environment associated with the miner node, the method further comprises:

acquiring a hash value of a block previous to a block ready for bookkeeping; and after determining that the miner node has won the bookkeeping right, the bookkeeping right determination operation further comprises:

signing bookkeeping right determination information with a preset private key stored in the trusted execution environment, to obtain a signature of the bookkeeping right determination information, in the trusted execution environment associated with the miner node, wherein the bookkeeping right determination information comprises: the hash value of the block previous to the block ready for bookkeeping, the lower-limit accumulative unused duration, and an account address bound to the miner node, wherein the account address bound to the miner node is stored in the trusted execution environment associated with the miner node; and broadcasting the bookkeeping right determination information and the signature of the bookkeeping right determination information to nodes neighboring the miner node.

6. The method according to claim 5, wherein the preset private key is a private key preset when the trusted execution environment is issued, or a private key corresponding to the account address bound to the miner node.

7. The method according to claim 5, wherein the bookkeeping right determination information further comprises a real-name authentication identifier stored in the trusted execution environment associated with the miner node, wherein the real-name authentication identifier is used for representing whether the trusted execution environment associated with the miner node has passed a real-name authentication from a third-party organization.

8. The method according to claim 1, wherein the trusted execution environment associated with the miner node interacts with an outside world in a ciphertext manner; and the executing the bookkeeping right determination operation in the trusted execution environment associated with the miner node comprises:

encrypting an instruction corresponding to the bookkeeping right determination operation by using a preset administrator public key, to obtain an encrypted instruction;

decrypting an obtained encrypted instruction by using a preset administrator private key stored in the trusted execution environment associated with the miner node, to obtain a decrypted instruction, and executing the decrypted instruction to execute the bookkeeping right determination operation in the trusted execution environment associated with the miner node; and encrypting a result of executing the bookkeeping right determination operation by using a preset key stored in the trusted execution environment associated with the miner node, and then outputting an encrypted execution result from the trusted execution environment associated with the miner node.

9. The method according to claim 8, further comprising:
verifying the signature of received bookkeeping right determination information by using a preset public key, in response to reception of the bookkeeping right determination information and the signature of the bookkeeping right determination information;
checking a hash value of a previous block and a lower-limit accumulative unused duration in the received bookkeeping right determination information by using a hash value of a tail block in the blockchain of the miner node and the lower-limit accumulative unused duration, respectively, in response to a successful verification of the signature of the received bookkeeping right determination information;
determining, in response to a successful checking, an account address in the received bookkeeping right determination information as an account address bound to a miner node which has won a first current block, wherein the first current block is a block next to a block indicated by the hash value of the previous block in the received bookkeeping right determination information.

10. The method according to claim 9, wherein, after determining the current accumulative unused duration for the miner node, the bookkeeping right determination operation further comprises:
updating the current accumulative unused duration to an upper-limit accumulative unused duration, in response to a determination that the current accumulative unused duration for the miner node is more than the upper-limit accumulative unused duration.

11. The method according to claim 1, further comprising, before executing the bookkeeping right determination operation in the trusted execution environment associated with the miner node,
judging whether a time interval from a time at which a previous bookkeeping is performed in the trusted execution environment is more than a cool-down duration, wherein the cool-down duration is k times the lower-limit accumulative unused duration, wherein k is a constant greater than 0 and less than 1; and
executing the bookkeeping right determination operation in the trusted execution environment, if yes.

12. The method according to claim 11, further comprising, after the judging whether a time interval from a time at which a previous bookkeeping is performed in the trusted execution environment is more than a cool-down duration,
calculating, if the time interval from the time at which the previous bookkeeping is performed in the trusted execution environment is not more than the cool-down duration, a time interval to a next competition for the bookkeeping right in which the trusted execution environment is able to participate, wherein the time interval is a difference between the cool-down duration and the time interval from the time at which the previous bookkeeping is performed in the trusted execution environment.

13. The method according to claim 11, wherein the time interval t1 from the time at which the previous bookkeeping is performed in the trusted execution environment is calculated by a following formula:

$$t1 = (\text{Height2} - \text{Height1}) \cdot \bar{t}$$

where Height2 is a height of a block, in the blockchain, where the trusted execution environment has won the bookkeeping right, Height1 is a height of a block, in the blockchain, that is generated by the previous bookkeeping in the trusted execution environment, and $\bar{t}$ is a preset constant for the blockchain system, which is used for representing an average time required for generating a block in the blockchain system.

14. The method according to claim 1, further comprising:
receiving a block ready for bookkeeping that is broadcast by a miner node in the same chain; and
calculating a time interval from a time at which the block ready for bookkeeping is generated to a time at which a previous bookkeeping is performed in the trusted execution environment that has won the bookkeeping right for the block, and approving the block ready for bookkeeping if a calculated time interval is more than a cool-down duration, wherein the cool-down duration t2 is k times the lower-limit accumulative unused duration, wherein k is a constant greater than 0 and less than 1.

15. The method according to claim 1, wherein the blockchain system comprises at least one parallel chain, the parallel chain comprises routing nodes and at least one miner node, the routing nodes of the at least one parallel chain are connected over a network, and the method further comprises:
receiving a block ready for bookkeeping that is broadcast by a miner node in the same parallel chain;
extracting, from the block ready for bookkeeping, public key information corresponding to the trusted execution environment that has won the bookkeeping right for the block, and calculating, according to the public key information, a chain number of a parallel chain where mining is performed by the trusted execution environment; and
approving the block ready for bookkeeping if a calculated chain number of the parallel chain is a chain number of a parallel chain where the miner node itself is located.

16. The method according to claim 15, wherein the calculating, according to the public key information, a chain number of a parallel chain where mining is performed by the trusted execution environment comprises:
calculating the chain number of the parallel chain where mining is performed by the trusted execution environment according to the public key information in accordance with a following formula:

$$\text{Num} = K \% N$$

where K is a miner identification number calculated according to the public key information, N is a total number of parallel chains in the blockchain system, and % denotes a remainder operation.

17. The method according to claim 1, wherein the trusted execution environment has its own unique device number preset therein, and the trusted execution environment provides only an interface for one-time registration of a miner account and does not provide an interface for modifying or deleting a registered miner account.

* * * * *